US012602423B2

(12) United States Patent
Fatal et al.

(10) Patent No.: US 12,602,423 B2
(45) Date of Patent: Apr. 14, 2026

(54) REAL-TIME NORMALIZATION OF RAW ENTERPRISE DATA FROM DISPARATE SOURCES

(71) Applicant: Actabl Holdings, LLC, Oldsmar, FL (US)

(72) Inventors: Michael J Fatal, Marietta, GA (US); Mike Patton, Titusville, FL (US); Todd H. Chapuis, Cumming, GA (US); Nick J. Fessel, Anderson, SC (US); Nathan Walden, Acworth, GA (US); Peter T. Bissert, McMurray, PA (US); Kathryn H. Green, Avondale Estates, GA (US); Clark A. Brayton, Irmo, SC (US); Azhar A. Saiyed, Alpharetta, GA (US); Christopher S. Harvey, Cumming, GA (US); Pritesh R. Patel, Cumming, GA (US)

(73) Assignee: Actabl Holdings, LLC, Oldsmar, FL (US)

( * ) Notice: Subject to any disclaimer, the term of this patent is extended or adjusted under 35 U.S.C. 154(b) by 0 days.

(21) Appl. No.: 18/607,247

(22) Filed: Mar. 15, 2024

(65) Prior Publication Data

US 2025/0291836 A1    Sep. 18, 2025

(51) Int. Cl.
*G06F 16/00* (2019.01)
*G06F 16/383* (2019.01)

(52) U.S. Cl.
CPC .................................. *G06F 16/383* (2019.01)

(58) Field of Classification Search
CPC ...................................................... G06F 16/383
See application file for complete search history.

(56) References Cited

U.S. PATENT DOCUMENTS

| | | | | |
|---|---|---|---|---|
| 7,328,166 B1* | 2/2008 | Geoghegan | ............ | G06Q 10/02 705/5 |
| 2003/0139951 A1* | 7/2003 | Seal | ........................ | G06Q 10/02 705/5 |
| 2007/0162414 A1* | 7/2007 | Horowitz | .............. | G06F 16/355 |
| 2009/0300139 A1* | 12/2009 | Shoemaker | ............ | H04L 67/06 709/217 |
| 2010/0030590 A1* | 2/2010 | Sodaro | ................... | G06Q 10/02 235/382 |

(Continued)

*Primary Examiner* — Syed H Hasan

(74) *Attorney, Agent, or Firm* — Shook, Hardy & Bacon L.L.P.

(57) ABSTRACT

Various embodiments relate to normalizing raw data by mapping the raw data to a computer-readable tag. A computer-readable tag may be an identifier that at least partially represents a category (e.g., a department) and/or the raw data itself. In response to receiving the raw data, some embodiments perform the mapping by, for example, performing natural language processing (NLP) on each particular department's raw data to associate natural language words in the raw data to its corresponding computer-readable tag and then populating, at a data structure that includes the computer-readable tag, an entry with data (representing the raw data) in a standardized format. In this way, regardless of whether different sets of raw data come from disparate sources that have diverse formats, protocols, or structures relative to each other, the normalized data and standardized form makes the data compatible.

13 Claims, 10 Drawing Sheets

(56) References Cited

U.S. PATENT DOCUMENTS

| | | | |
|---|---|---|---|
| 2010/0228574 A1* | 9/2010 | Mundinger | G06Q 10/047 |
| | | | 701/532 |
| 2013/0318030 A1* | 11/2013 | Nagel | G06F 16/283 |
| | | | 707/E17.014 |
| 2014/0046931 A1* | 2/2014 | Mok | G16H 10/60 |
| | | | 707/741 |
| 2018/0160269 A1* | 6/2018 | Baarman | H04W 4/80 |
| 2018/0330206 A1* | 11/2018 | Shyshkov | G06F 16/583 |
| 2021/0118010 A1* | 4/2021 | Landry | G06Q 30/0277 |
| 2023/0300623 A1* | 9/2023 | Barnes | H04W 12/72 |
| | | | 455/411 |

* cited by examiner

300

| RAW DATA CONTAINS | MAP TO | TAGS |
|---|---|---|
| NET PRESENT VALUE (NPV), AMORTIZATION CASH FLOW ANALYSIS, CAPITAL EXPENDITURE CAP | FINANCIAL DEPT., CAPITAL EXPENDITURE | FDCE |
| EBIT, OPERATING INCOME, GROSS PROFIT, EBITDA, OPERATING MARGINE | FINANCIAL DEPARTMENT, EBIT | FDET |
| REVPAR, OCCUPANCY RATE, ADR, ROOM REVENUE, ROOM TYPE MIX | ROOM DEPARTMENT, REVPAR | RORP |
| NO SHOW, EARLY CANCELLATION, LATE CANCELLATION, NON-REFUNDABLE | RESERVATIONS DEPT. CANCELLATION | REDCA |
| BOOKING ENGINE, COMISSIONS STRUCTURE AGGREGATOR | RESERVATIONS DEPT., ONLINE TRAVEL AGENCY | RDOT |
| HAIRCUT, HIGHLIGHTS, PEDICURE MANICURE, WALKING, FACIAL, SCALP, EXTENSION | SPA & GOLF DEPT., SALON & BODY | SGSB |
| . . . | . . . | . . . |

Secret Screen – REFERENCE –

Update Drivers | Update Item Totals

| Actions | ID | PID | Tag | Sort | Class | Subclass | Acct | Name | Types | Formula | Stat Acct | POR 1 | POR 2 | Alt Tag 1 | Alt Tag 2 |
|---|---|---|---|---|---|---|---|---|---|---|---|---|---|---|---|
| | 15 | 0 | PR | 1 | A | | | REVENUE | ABC:01: | XYZ | | 5 | 0 | | O |
| | 16 | 0 | PE | 2 | A | | | DEPARTM... | ABC:02: | XYZ | | 5 | 0 | | D |
| | 17 | 0 | PD | 3 | A | | | PROFIT | ABC:03: | XYZ001 | | 5 | 0 | | D |
| | 19 | 0 | OP | 4 | A | | | GROSS | ABC:03: | XYZ002 | | 5 | 0 | | C |
| | 20 | 0 | OP | 5 | A | | | NET | ABC:03: | XYZ003 | | 5 | 0 | | N |
| | 22 | 0 | HE | 6 | A | | | EXPENSES | ABC:04: | XYZ | | 5 | 0 | | L |
| | 24 | 0 | 1 | 7 | A | | | ROOMS | ABC:03: | XYZ004 | | 5 | 0 | | U |
| | 25 | 0 | 2 | 8 | A | | | OUTLET | ABC:03: | XYZ004 | | 5 | 0 | | |
| | 26 | 0 | 3 | 9 | A | | | MFP | ABC:03: | XYZ004 | | 5 | 0 | | |
| | 27 | 0 | 4 | 10 | A | | | PAR | ABC:05: | XYZ004 | | 5 | 0 | | |
| | 28 | 0 | 5 | 11 | A | 35 | | TIP | ABC:06: | | 99 | 5 | 0 | | F |
| | 67 | 0 | 6 | 12 | A | | | FOOD | ABC:07: | ABC+XYZ | | 5 | 0 | | F |
| | 70 | 0 | 7 | 13 | A | | | FOOD | ABC:03: | ABC+XYZ | | 5 | 0 | | C |
| | 69 | 0 | 8 | 14 | A | | | OTHER | ABC:08: | ABC+816 | | 5 | 0 | | C |
| | 68 | 0 | 9 | 15 | A | | | OTHER2 | ABC:09: | ABC+916 | | 5 | 0 | | |
| | 83 | 0 | 6 | 16 | A | | | OTHER3 | ABC:04: | ABC+216 | | 5 | 0 | | |
| | 71 | 0 | 10 | 17 | A | | | LABOR1 | ABC:10: | ABC+316 | | 5 | 0 | | H |
| | 72 | 0 | 11 | 18 | A | | | REV | ABC:04: | | | 5 | 0 | | N |
| | 76 | 0 | 12 | 19 | A | | | HOUSE2 | ABC:04: | ABC+416 | | 5 | 0 | | D |
| | 75 | 0 | 13 | 20 | A | | | TOTAL | ABC:11: | ABC+516 | | 5 | 0 | | |
| | 74 | 0 | 14 | 21 | A | | | DATE | ABC:04: | ABC+716 | | 5 | 0 | | |
| | 73 | 0 | 15 | 22 | A | | | INTEREST | ABC:12: | ABC+616 | | 5 | 0 | | N |
| | 77 | 0 | 16 | 23 | A | | | LESS2 | ABC:04: | DEF+112 | | 5 | 0 | | |
| | 78 | 0 | 17 | 24 | A | | | INTEREST2 | ABC:07: | GH+113 | | 5 | 0 | | O |
| | 93 | 0 | 18 | 25 | A | | | LABOR2 | ABC:04: | GH+114 | | 5 | 0 | | O |
| | 94 | 0 | 19 | 26 | A | | | SALERIES | ABC:04: | GH+115 | | 5 | 0 | | O |
| | 97 | 0 | 20 | 27 | A | | | WAGES01 | ABC:13: | GH+116 | | 5 | 0 | | O |
| | 98 | 0 | 21 | 28 | A | | | WAGES02 | ABC:13: | GH+117 | | 5 | 0 | | O |
| | 99 | 0 | 22 | 29 | A | | | WAGES03 | ABC:13: | GH+118 | | 5 | 0 | | O |
| | 90 | 0 | 23 | 30 | A | | | WAGES04 | ABC:13: | GH+119 | | 5 | 0 | | O |
| | 91 | 0 | 24 | 31 | A | | | WAGES05 | ABC:13: | GH+120 | | 5 | 0 | | O |
| | 92 | 0 | 25 | 32 | A | | | WAGES06 | ABC:13: | GH+121 | | 5 | 0 | | O |

INFERENCE PREDICTION(S)

TAG(S) 609

TRAINING PREDICTION(S)

TAG(S) 607

WEIGHT ADJUSTMENTS

605

621 622

624

620

DEPLOYMENT INPUT(S) 603

-REAL-TIME RAW DATA

PRE-PROCESSING 604

PRE-PROCESSING 616

TRAINING DATA INPUT(S) 615

-REGISTRATION RAW DATA

800

802 — RECEIVE LABELED RAW DATA-TAG PAIRS

804 — TOKENIZE AND NUMERICALLY EMBED RAW DATA-TAG PAIRS

806 — USING THE NUMERICALLY EMBEDDED RAW DATA-TAG PAIRS AS INPUT, TRAIN A MACHINE LEARNING MODEL BY ADJUSTING WEIGHTS TO MINIMIZE A PREDEFINED OBJECTIVE FUNCTION

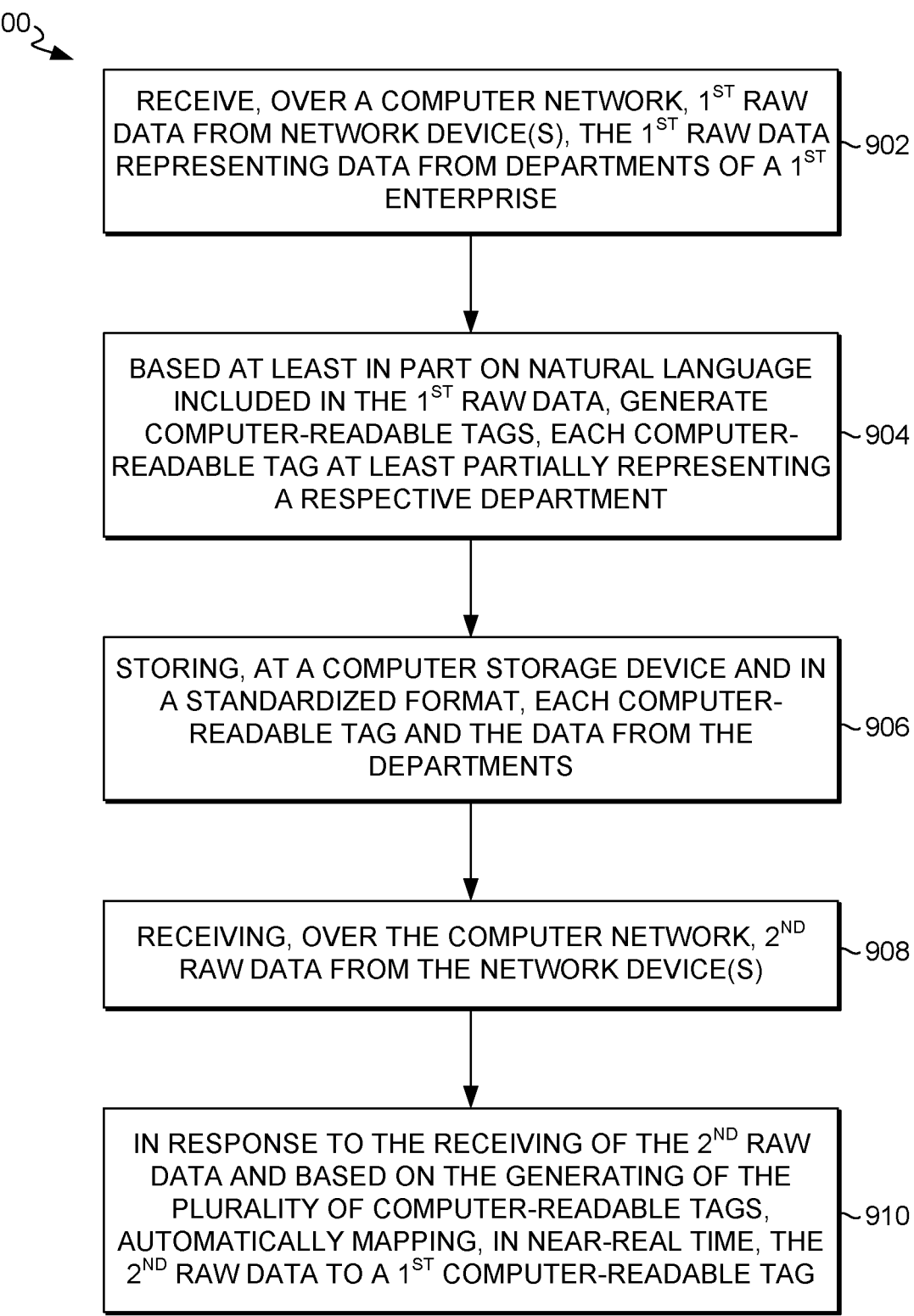

900

RECEIVE, OVER A COMPUTER NETWORK, 1ST RAW DATA FROM NETWORK DEVICE(S), THE 1ST RAW DATA REPRESENTING DATA FROM DEPARTMENTS OF A 1ST ENTERPRISE ~902

BASED AT LEAST IN PART ON NATURAL LANGUAGE INCLUDED IN THE 1ST RAW DATA, GENERATE COMPUTER-READABLE TAGS, EACH COMPUTER-READABLE TAG AT LEAST PARTIALLY REPRESENTING A RESPECTIVE DEPARTMENT ~904

STORING, AT A COMPUTER STORAGE DEVICE AND IN A STANDARDIZED FORMAT, EACH COMPUTER-READABLE TAG AND THE DATA FROM THE DEPARTMENTS ~906

RECEIVING, OVER THE COMPUTER NETWORK, 2ND RAW DATA FROM THE NETWORK DEVICE(S) ~908

IN RESPONSE TO THE RECEIVING OF THE 2ND RAW DATA AND BASED ON THE GENERATING OF THE PLURALITY OF COMPUTER-READABLE TAGS, AUTOMATICALLY MAPPING, IN NEAR-REAL TIME, THE 2ND RAW DATA TO A 1ST COMPUTER-READABLE TAG ~910

*FIG. 9*

REAL-TIME NORMALIZATION OF RAW ENTERPRISE DATA FROM DISPARATE SOURCES

BACKGROUND

Various enterprises, such as hotels, generate or access enterprise data across multiple disparate sources. Disparate sources refers to data or information coming from different and unrelated origins (e.g., servers or enterprises) and/or unrelated systems (e.g., operating systems or computer applications within different departments of the same enterprise). These sources might have diverse formats, protocols, or structures, making them distinct and often incompatible with each other. For instance, in a computer network environment, disparate sources could include data streams from multiple network devices (e.g., enterprise servers), software applications, operating systems, databases, or even different networks that operate on distinct communication protocols. Integrating or standardizing information from such diverse sources poses challenges due to differences in data formats (e.g., database table schemas), transmission methods, or compatibility issues.

BRIEF DESCRIPTION OF THE DRAWINGS

The present systems and methods for subcutaneous authentication are described in detail below with reference to the attached drawing figures, wherein:

FIG. 3 is a schematic diagram of an example data structure illustrating how certain words of raw data are mapped to particular tags, according to some embodiments;

FIG. 5 is a screenshot of an example user interface table, according to some embodiments;

FIG. 9 is a flow diagram of an example process for normalizing different sets of raw data via tags, according to some embodiments.

DETAILED DESCRIPTION

Figure 1:
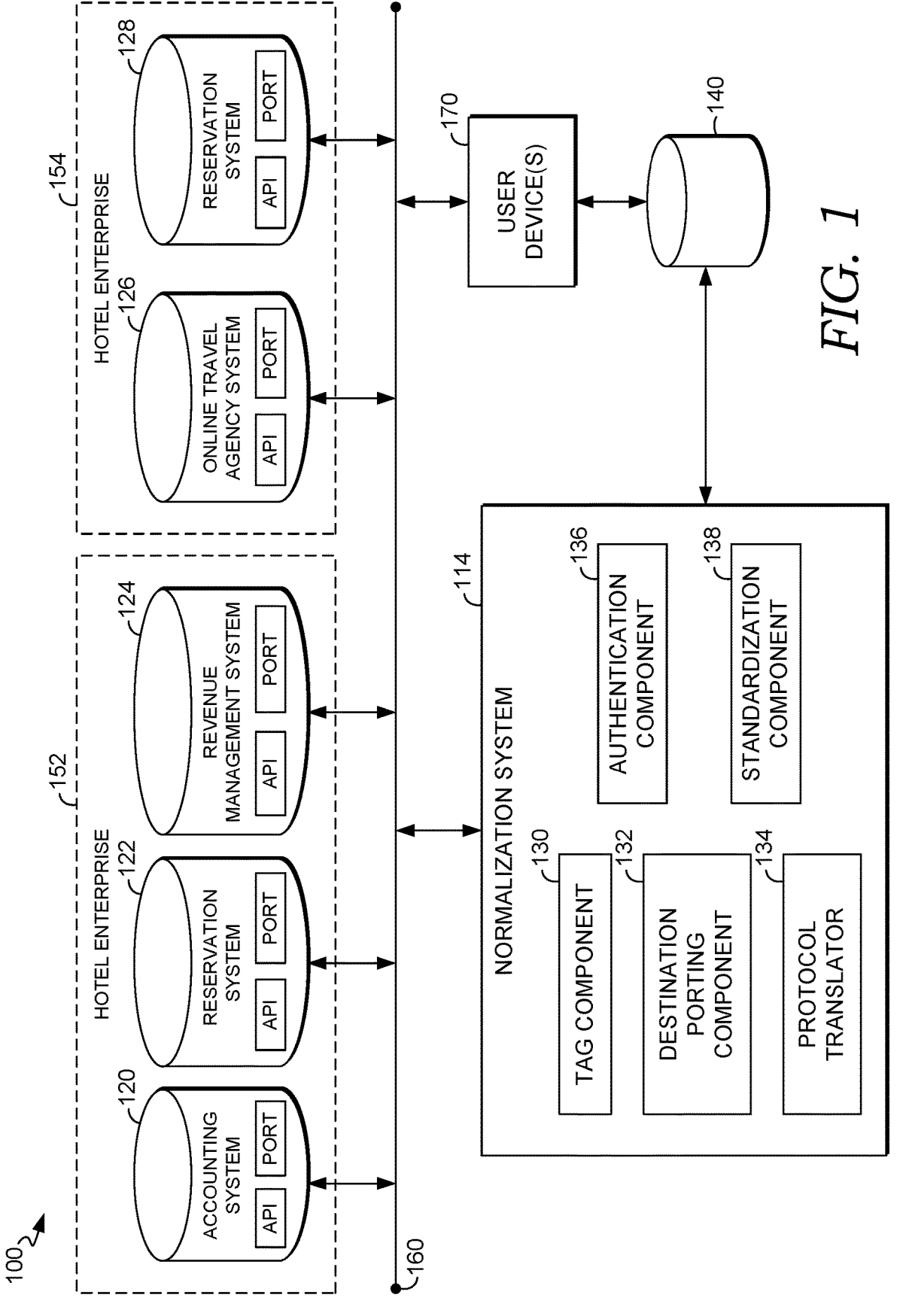
FIG. 1 is a block diagram of an example system, according to some embodiments.

As described above, various enterprises generate or receive enterprise data across multiple disparate sources. For example, for its operations, a hotel or hotel management server may have to open a communication channel (e.g., via TCP/IP handshaking) with dozens of other servers or platforms (e.g., operating systems or cloud nodes) that each generate a respective set of hotel enterprise data from each department. A hotel may have various departments such as marketing, revenue management, property management, accounting, central reservation, online travel agency systems, benchmarking, guest satisfaction, human resources, maintenance and engineering, spa and recreation, concierge, food and beverage, and the like. However, the enterprise data of each of these departments may have to be generated, communicated, or accessed across different servers, platforms, or other disparate data sources. In almost all cases, each of these different enterprise data is provided by separate vendors and each corresponding system (e.g., a PMS versus an accounting system) may have different data schemas. Further, each department within a management company has its own naming convention and processes. A hotel or group of hotels under one brand within the management company's portfolio could also have a different naming convention than other hotels in another brand. Across a management company's portfolio, there could be multiple vendors providing the same systems, for example. It is very common that some of a hotel management company's branded hotels will have one property management system (PMS) used by that brand, while some other of its hotels would have another PMS from another vendor used by another brand, and the like.

There are various technical problems with this or other enterprise data coming from disparate sources, such as incompatibility and inaccuracy. As described above, these disparate sources might have diverse formats, protocols, or structures relative to each other, making them distinct and often incompatible with each other. For example, with respect to diverse formats, information can be stored and transmitted in various formats, such as text, images, videos, audio, or structured data (e.g., databases). Each format has its own way of organizing and representing data. For example, text data can be encoded in different character encodings (ASCII, UTF-8, etc.) across departments or enterprises. Images might use different file formats (JPEG, PNG, GIF) with varying compression methods and metadata across departments or enterprises. Structured data (e.g., from the marketing department versus the finance department) can be in different formats like JSON, XML, CSV, or proprietary formats used by specific applications or systems. Communication protocols define the rules and conventions for exchanging data between devices or systems in a network. Disparate sources might use different protocols, which can include: Internet protocols like HTTP, FTP, TCP/IP, or UDP for transmitting data over the internet. Application-specific protocols used by certain software or devices, like MQTT for IoT devices or SMTP for email communication. Regarding different structures, this refers to how data is organized or structured within a file or system. For instance structured data might be organized into tables in a relational database, each with its own schema. Unstructured data, such as text documents or free-form data, lacks a predefined data model or organization. Semi-structured data, like JSON or XML, has some structure but is more flexible compared to strictly structured data formats. Accordingly, for example, reservations systems of a reservation department may employ a structured relational database format, while an online travel agency department may strictly use HTLM via native web pages, which is a different format than the relational database. When disparate sources have differences in these aspects—varying file formats, communication protocols, or data structures—it becomes challenging to seamlessly integrate or exchange information between them. Systems designed to work with one type of format or protocol may struggle to interpret or process data from sources using different standards, leading to compatibility issues and requiring specialized solutions for effective communication and integration.

In an illustrative example, server A, which hosts concierge enterprise data, may try to send or exchange information to server B (e.g., a hotel server or hotel management company server). Server A may store enterprise data in a proprietary format using a custom protocol for communication. Server B may use a different data format and communicates via a standard protocol widely adopted in the industry. When server A attempts to send data to server B, several compatibility issues may arise. For example, server A might store data in a format that is specific to its architecture, which server B does not understand or cannot process. For instance, server A might use a proprietary binary format to represent data, while server B expects data in a standardized JSON or XML format. Server A might use a different character encoding scheme (ASCII, UTF-8, etc.) compared to what System B supports. Server A may communicate using its custom protocol, whereas server B may follows an industry-standard protocol like HTTP or TCP/IP. As a result, server A's protocol might have different rules or headers that server B does not recognize, leading to communication breakdown or inability to communicate or increased computing latency. Server A might use a non-standard port for communication, causing issues when trying to connect with server B, which expects standard port usage. Even if the data format and protocol are aligned, the interpretation of data might differ. Server A might use terminology or codes specific to its domain that server B does not understand, leading to misinterpretation, inaccurate, or incorrect processing of information. For instance, server A might represent dates in a different format (DD/MM/YYYY) compared to server B (MM/DD/YYYY), causing errors during data exchange or communication.

To alleviate some of these technical problems, some technologies require heavy manual data processing, which leads to excessive input/output (I/O), increased network latency, and data errors. For example, spreadsheet technologies may execute manual user requests to name different departments of an enterprise by column and input enterprise data into each column. In other words, a user must manual provide computer user input into the spreadsheet to identify each department of an enterprise and then manually codify and enter in the enterprise data under the respective department name column. This is because of the problems described above, where disparate sources have diverse formats, protocols, or structures relative to each other, making them distinct and often incompatible with each other. Not only is manual user input tedious and arduous with respect to the user experience, there are various technical problems. First, there is a tremendous amount of wear and tear on storage devices (e.g., a disk drive) because of excessive computer I/O (e.g., excess physical read/write head movements on non-volatile disk). For example, each time a user issues a query to retrieve information from a data source and inputs information to the spreadsheet, a read/write head or other component has to reach out to a storage device to perform a read and write operation, which is time consuming, error prone, and eventually wears on read/write head when the user inputs are excessive, as is the case when queries and spreadsheets are used to handle different enterprise data sets. Reaching out to disk is very expensive in these situations because of the address location identification time and mechanical movements required of a read/write head, which further leads to excessive heat generation, which can cause breakage or address location errors of the read/write head.

Similarly, there is increased computing latency based on manual database lookup of enterprise data by users. For example, users may need to repetitively issue queries (e.g., SQL queries) for different databases across the disparate sources to input data into the spreadsheet. This is computationally expensive because processing queries consume a lot of computing resources (e.g., decrease throughput, increase in network latency, etc.). For instance, an optimizer engine of a database manager module calculates a query execution plan (e.g., calculates cardinality, selectivity, etc.) each time a query is issued, which requires a database manager to find the least expensive query execution plan to fully execute the query. This decreases throughput and increases network latency, and can waste valuable time. Most database relations contain hundreds if not thousands of records. Repetitively calculating query execution plans on this quantity of rows decreases throughput and increases network latency. Similarly, when data (a message) gets sent over a computer network, it is typically broken up into smaller packets and then reassembled. Depending on the network protocol (e.g., TCP/IP), each packet is populated with lots of data, such as source port, destination, port, checksums, and payload data. These packets are generated each time a database is queried over a computer network, which means that there is increased network latency. Similarly, there is increased I/O because the enterprise data is stored to disparate data sources, meaning the user has to access different databases or other origins (e.g., servers) that host the respective enterprise data. This requires increased I/O operations to read or access data, thereby placing unnecessary wear on storage device components, such as a read/write head.

Various embodiments provide one or more technical solutions that have technical effects in light of one or more of the technical problems described herein. Various embodiments are directed to normalizing raw data by automatically mapping (in near real-time relative to a time at which the raw data is received or generated) the raw data to a computer-readable tag. A computer-readable tag may be an identifier that at least partially represents a category (e.g., a department) and/or the raw data itself. For example, embodiments can first receive, over a computer network, the raw data from one or more network devices (e.g., a marketing server), where the raw data includes department data from one or more departments (e.g., marketing enterprise data of a marketing department and maintenance data of a maintenance department). In response to receiving the raw data, some embodiments perform the automatic mapping by, for example, performing natural language processing (NLP) on each particular department's raw data to associate natural language words in the raw data to its corresponding computer-readable tag and then automatically populate, at a data structure that includes the computer-readable tag, an entry with data (representing the raw data) in a standardized format. In this way, regardless of whether these different sets of raw data come from disparate sources that have diverse formats, protocols, or structures relative to each other, the normalized data and standardized form makes the data compatible, as described in more detail below.

In operation, some embodiments first generate computer-readable tags as a part of, for example, onboarding one or more enterprises. For example, onboarding may include storing enterprise information, such as name, billing information, and different department data. In an illustrative example, some embodiments may extract and receive first raw data corresponding to sales numbers of a marketing department and reservations made according to a reservation department of the same enterprise. Using hand-coded rules or word-matching algorithms (e.g., TF-IDF or fuzzy matching), some embodiments may then generate a computer-readable tag representing each enterprise, department, category of a department, and/or raw data and then store such raw data at a computer storage device (e.g., disk) in a standardized format.

After onboarding an enterprise, particular embodiments can then automatically map, in near real-time, the enterprise's incoming raw data to the computer-readable tag that was generated at onboarding time. For example, using NLP or other machine learning functionality, particular embodiments can ingest the raw data and automatically map, in near real-time, such raw data to its corresponding tag (e.g., based on training a model to learn which set of raw data belongs to which tag), which is then provided to the standardized format (e.g., via data transformation, normalization, and integration).

Various embodiments of the present disclosure employ technical solutions that have various technical effects in light of the technical problems described herein. As described above, various enterprises generate or receive enterprise data across multiple disparate sources. Various embodiments have the technical effect of increased accuracy and compatibility even when data is generated or received from disparate sources. Even if these disparate sources have diverse formats, protocols, or structures relative to each other, various embodiments make them compatible by normalizing raw data via generating one or more tags and/or automatically mapping raw data to the one or more tags. For example, even if structured data is in different formats like JSON, XML, CSV, or proprietary formats used by specific applications or systems, particular embodiments generate a single tag for all 3 formats such that data, for example, can be populated in a data structure under the single tag for all 3 formats. Using the illustration above, for example, even if server A might use terminology or codes specific to its domain that server B does not understand, both server A and server B's data is mapped to the same computer-readable tag, leading to interpretability and accuracy. For instance, even though server A might represent dates in a different format (DD/MM/YYYY) compared to server B (MM/DD/YYYY), both server A and server B's data is mapped to the same date tag with a singular format (e.g., MM/DD/YYYY), thereby increasing accuracy and compatibility during data exchange or communication.

Some embodiments improve existing technologies, such as spreadsheet applications. As described above, some technologies, such as spreadsheet technologies, may execute manual user requests to name different departments of an enterprise by column and input enterprise data into each column. However, various embodiments reduce or do not require manual user input because they normalize raw data by automatically mapping the raw data to one or more tags, which is not only less tedious and arduous with respect to the user experience, this reduces various technical problems. First, there is a reduced amount of wear and tear on storage devices because of reduced computer I/O (e.g., fewer physical read/write head movements on non-volatile disk). For example, instead of a user having to issue queries to retrieve information from multiple disparate data sources and input information to the spreadsheet (making a read/write head having to reach out to a storage device to perform multiple read and write operations), particular embodiments automatically map, in near-real time relative to when the raw data is generated or received, the raw data to one or more tags. Such automatic mapping in real-time is less error prone and wears less on a read/write head because there are no or fewer user manual inputs, which means that there are fewer reads and/or writes to disk or other storage devices. For example, instead of a user having to manually create a column name, manually enter in data under the column name, and sending a query to retrieve data from disparate data sources (all requiring 3 or more I/O operations), some embodiments automatically map the raw data to a tag, thus requiring only a single I/O. For example, the raw data can automatically be populated (e.g., and/or converted to a single format) in a data structure next to its corresponding computer-readable tag, which requires only a single I/O operation. Accordingly, identification time and mechanical movements required of a read/write head is reduced, which further leads to reduced heat generation, and therefore a reduction in a likelihood of access errors or breakage of the read/write head.

Similarly, there is reduced computing latency relative to manual database lookup of enterprise data by users. As described above, users may need to repetitively issue queries (e.g., SQL queries) for different databases across the disparate sources to input data into the spreadsheet, which is computationally expensive. However, various embodiments to not issue user queries across databases (e.g., to retrieve different reports). Rather, once the data is generated or received, particular embodiments automatically normalize raw data by mapping, in near real-time, the raw data to one or more tags. In this way, an optimizer engine of a database manager module does not have to calculate a query execution plan, thereby increasing throughput and decreasing network latency. Similarly, because databases need not be queried due to the real-time mapping of raw data to one or more tags, messages are not sent, which means that packets are not needing to be populated with data when data, such as source port, destination, port, checksums, and payload data, transmitted, and then reassembled. Accordingly, because these packets are not generated there is decreased network latency. There is also decreased I/O because the user does not have to access different databases or other origins (e.g., servers) that host the respective enterprise data, which requires increased I/O operations to read or access data, and therefore placing unnecessary wear on storage device components, such as a read/write head. Rather, such disparate data sources automatically transmit their data in near real-time and without a user query request so that the raw data can be mapped in real time to such transmission.

With reference to the figures, FIG. 1 is a block diagram of an example system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionalities to those of example computing device 11 of FIG. 10.

In the embodiment illustrated in FIG. 1, the system 100 includes computing systems of the hotel enterprise 152 and computing systems of the hotel enterprise 154, which is communicatively coupled, via the one or more networks 160 (e.g., a Local Area Network (LAN)) and/or a Wide Area Network (WAN)), to one or more user devices 170 (e.g., a mobile phone) and the normalization system 114. The hotel enterprise 152 includes or has access to the accounting system 120, the central reservation system 122, and the revenue management system 124. The hotel enterprise 154 includes or has access to the online travel agency system 126 and the reservation system 128.

The normalization system 114 is generally responsible for receiving raw data from each of the systems of the hotel enterprise 152 and hotel enterprise 154, normalizing the raw data, and then outputting the normalized data in a standardized format in a central repository 140. In some embodiments, the normalization system 200 is additionally responsible for generating, transmitting, and/or receiving, over the network(s) 160, one or more messages to/from the one or more user devices 170 such that each user receives or generates updated information (e.g., an indication that a tag has been generated about one or more departments). The normalization system 114 may also provide, over the computer network(s) 160, remote access to the user device(s) 170 such that any user can update information about a department in near real-time (e.g., via a graphical user interface), such as in a non-standardized format.

In some embodiments, only hotel management enterprise (or any suitable enterprise management company) employees or contractors have access (via access control mechanisms, such as password authentication) to the normalization system 114 and central repository 140. Whereas individual hotels and their systems or customers of the hotel do not have access to the normalization system 114. One exception to this may be through a specialized API, where, for example, a hotel system may issue a query to the central repository 140 for a report, and based on such hotel having been authenticated and authorized only to retrieve its own data (and not other hotels' data), the report (e.g., total amount expended in each department) is returned. In other words, access control mechanisms may be set in place so that individual hotels can retrieve their own data from each department but no other data from any other hotel. A hotel management enterprise is an organization that specializes in managing hotels and other lodging properties on behalf of the property owners. These management companies provide various services aimed at optimizing the operations, maximizing revenue, and enhancing the overall performance of the hotels they manage. The services offered by hotel management enterprises can vary but may include operations management, revenue management, financial management, sales and marketing, human resources, and/or property management.

In some embodiments, one or more of the systems—the accounting system 120, the central reservation system 122, the revenue management system 124, the online travel agency system 126, and/or the reservation system 120—represents one or more network devices, such as a cloud service or node (e.g., a computing device in a datacenter), a hardware server (e.g., a blade server), or other computing device. In some embodiments, one or more of these systems of the hotel enterprise 152 and 154 alternatively or additionally represent software or middleware-based entities, such as management systems (e.g., a Property Management System (PMS)), a particular application (e.g., a web application or mobile app), and/or other computer-readable or executable instructions. In some embodiments, one or more of the systems additionally or alternatively represent, include, or have access to a data store (e.g., a database or Storage Area Network (SAN)) of corresponding information. As illustrated in FIG. 1, each of the systems (e.g., accounting system 120) includes an Application Programming Interface (API) and port for communicating with the normalization system 114.

Each of the APIs is a set of rules, protocols (e.g., HTTP, REST, SOAP), and tools that allows a respective system (e.g., accounting system 120) and the normalization system 114 to communicate and interact with each other. It defines the methods and data formats that applications can use to request and exchange information. The APIs may be any suitable API for communicating between software and/or network devices. For example, Web APIs are accessed over the internet via HTTP/HTTPS and may use standard formats like JSON or XML for data exchange. Library APIs are sets of functions or procedures packaged in software libraries that other programs can use to perform specific tasks. Operating System APIs allow applications to interact with the underlying operating system's functionalities (e.g., file system APIs, networking APIs).

When connecting and contacting disparate data sources, ports at each of the systems may need to be configured to allow the data to flow between each of the systems and the normalization system 114. Ports are logical endpoints used by networking protocols to identify specific services or processes on a host device. They enable different applications or services on a single device to communicate over a network by allowing data to be sent and received through designated port numbers. Ports are associated with network communications and serve as entry points for incoming and outgoing data transmissions. For example, a web server (e.g., the normalization system 114) might use port 80 (HTTP) or port 443 (HTTPS) to listen for and respond to incoming requests from clients (e.g., the reservation system 128). The process of opening ports can be done manually or automatically depending on the system and the protocols being used. For example, a port can manually open a port by creating a new inbound rule for the specific port number. On the other hand, some routers support the Universal Plug and Play (UPnP) protocol, which allows network devices to automatically open ports when needed. In some embodiments, each port is opened and managed dynamically during runtime when applications or services initiate network connections. For example, a server application (e.g., accounting system 120), when started, might open specific ports to listen for incoming connections from clients or other servers. In response to a port being opened, in some embodiments this triggers a network channel to be opened (e.g., via a TCP/IP handshake) between the systems of the hotel enterprises 152/154 and the normalization system 114, so that data exchange or transmission can occur from the respective system (e.g., the revenue management system 124) and the normalization system 114.

In various embodiments, each of the systems within the hotel enterprise 152 and 154 represent or correspond to a particular department. For example, the accounting system may include accounting data (e.g., names of customers) of an accounting department, and the central reservation system 122 may include a database of all historic and future reservations corresponding to a reservation department. Although the hotel enterprises 152 and 154 are associated with or have access to specific systems, it is understood that these systems are representative only. As such, more or fewer systems may be included therein, such as a bench-marking system, guest satisfaction system, marketing system, and/or the like.

The normalization system 114 includes a tag component 130, a destination porting component 132, a protocol translator 134, an authentication component 136, and a standardization component 138. The tag component 130 is generally responsible for generating one or more tags and/or automatically mapping raw data from each system 120, 122, 124, 126, and 128 of the hotel enterprise 152 and/or 152 to the one or more generated tags, as described in more detail below.

The destination porting component 132 is generally responsible for acting as a server that listens on specific ports for incoming connections from each of the systems 120, 122, 124, 126 and 128. For instance, the normalization system 114 may include a web server that listens on port 80 for HTTP requests or port 443 for HTTPS requests. When a client (e.g., the accounting system 120) initiates a connection to the server, it directs its request to a specific port on the normalization system 114, indicating the type of service or application it wants to communicate with. Specifically, when the client sends a request to a server, it specifies the destination port (i.e., a port on the normalization system 114) it wants to reach. Each disparate system forwards its data to the normalization system 114 through designated ports that the normalization system 114 is listening on. When the disparate systems send their data, they establish connections with the normalization system 114 using these designated ports, enabling the normalization system 114 to receive and process the incoming data streams. For example, the accounting system 120 sends its raw data to the port 500 of the normalization system 114. Similarly, the central reservation system 122 sends its raw data to the normalization system's port 5002. The normalization system 114, acting as the server, listens on ports 5001 and 5002 to receive and process incoming data from each of the systems accounting system 120 and the central reservation system 122. This process is repeated for all systems 124, 126, and 128 and the normalization system 114.

The protocol translator 134 is generally responsible for translating raw data from one protocol to another. If, for example, the online travel agency 125 and the normalization system 114 use different communication protocols, components known as protocol converters or gateways might be used to translate data from one protocol to another. This helps in bridging the gap between systems that cannot directly understand each other's communication methods. The translation process involves mapping data elements from one protocol to another. This may require parsing incoming data to extract relevant information and transform it into a format compatible with the target protocol. Different protocols have different header structures or metadata formats. Translation in some embodiments involves converting headers and structures from one protocol to another, ensuring that essential information is maintained during the conversion process. This may involve mapping terminology, codes, or data representations to align with the target protocol's semantics. For example, some embodiments may convert data transmitted via HTTP to adhere to the SOAP protocol's XML-based message format, enabling SOAP-based systems to understand and process the data. In another example, some embodiments translate data represented in JSON format into XML format or vice versa to facilitate communication between systems using different data exchange standards. Middleware or integration platforms may include components that specialize in protocol translation. These tools act as intermediaries, receiving data in one protocol, translating it, and forwarding it in the desired protocol. In some embodiments, API gateways or proxies may perform protocol translation by accepting requests in one format, converting them to the intended format, and forwarding them to the destination system.

The authentication component 136 is generally responsible for ensuring secure communication between the systems 120, 122, 124, 126, 128 and the normalization system 114. In some embodiments, the authentication component 136 implements authentication mechanisms like API keys, tokens, or OAuth and/or encryption protocols like SSL/TLS, helps to protect data during transmission. Encrypted communication channels, for example, such as those established using Transport Layer Security (TLS) or Secure Sockets Layer (SSL), can provide a layer of authentication. These protocols not only encrypt data but also authenticate the identities of communicating systems, ensuring that data remains confidential and is exchanged between trusted entities.

The standardization component 138 is generally responsible for generating a standardized format to populate the raw data that is received from the systems 120, 122, 124, 126, and 128. To produce such standardize format, particular embodiments may perform mapping, data transformation, normalization, and integration. For example, during mapping, some embodiments, first identify (e.g., via word matching and rules) common attributes in the raw data across all disparate sources, like customer name, email, and contact details and responsively generate a single tag for the customer name, a single tag for the email, and/or a single tag for the contact details. This effectively creates a mapping schema that correlates fields from each disparate source to a standardized set of attributes. Regarding data transformation, some embodiments develop scripts, software, or an ETL (Extract, Transform, Load) process to convert data from each disparate source (e.g., an enterprise or department of a single enterprise) of the specific tag into a unified format, such as a standardized JSON or XML structure (e.g., converting the sales numbers and reservations made data described above). For instance, a script could read CSV files, extract relevant information, query the MySQL database, and access the API to retrieve and transform JSON responses—all to create a unified JSON format. With respect to normalization, some embodiments normalize data values to adhere to a consistent structure and conventions. This ensures uniformity in data representations like date formats (e.g., MM/DD/YYYY or YYYY-MM-DD) or contact information formats. With respect to integration, some embodiments merge or integrate the transformed data into a centralized repository or system (i.e., 140) that stores information in the standardized format. This repository may become a single source of truth where data from disparate sources is harmonized and easily accessible. For example, after the transformation process, all enterprise data, regardless of the source, is now structured in a standardized JSON format with fields for name, email, phone, address, and order history. Date formats have been standardized to YYYY-MM-DD. Contact details are uniformly represented (e.g., phone numbers in a specific format). This standardized format allows an enterprise's (e.g., a hotel management system) systems or applications to interact seamlessly with the consolidated customer data, enabling easier analysis, reporting, and utilization of information across the organization, despite the initial diversity in data sources and formats. In some embodiments, after such mapping, data transformation, normalization, and integration, the tag component 130 performs its functionality to map the standardized raw data to one or more tags since all the data is now standardized. In other embodiments, the tag component 130 performs its functionality as part of the "mapping" functionality in data standardization.

In an illustrative example of the system 100, the user device(s) 140 may first receive user input, such as sales numbers, which is uploaded to the accounting system 120. The accounting system 120 can responsively (and in near real-time relative to the time the user input was received), and automatically open up a communication channel with the normalization system 114 based on the destination porting component 132 listening for a port request and then automatically pass (in near real-time), via an API, its raw data to the normalization system 114. Such process may additionally be repeated for the central reservation system 122, the revenue management system 124, the online travel agency system 126, and the reservation system 128. Responsively, the tag component 130 automatically maps the received raw data to a corresponding tag that identifies or indicates which department the raw data came from (e.g., an accounting department). Responsively, the standardization component 138 may convert the raw data into a standardized format next to or in association with its corresponding tag. For example, the standardization component may convert the raw data to a particular format and then store a pointer, in computer memory, that points to or references the corresponding department tag. Responsively, the normalization system 140 causes presentation at one of the user device(s) 170 of the converted tag and/or associated tag information, such as a user interface with a tag ID and the related converted data. For example, the normalization system 140 may responsively cause presentation of the user interface 500 of FIG. 5.

Figure 2:
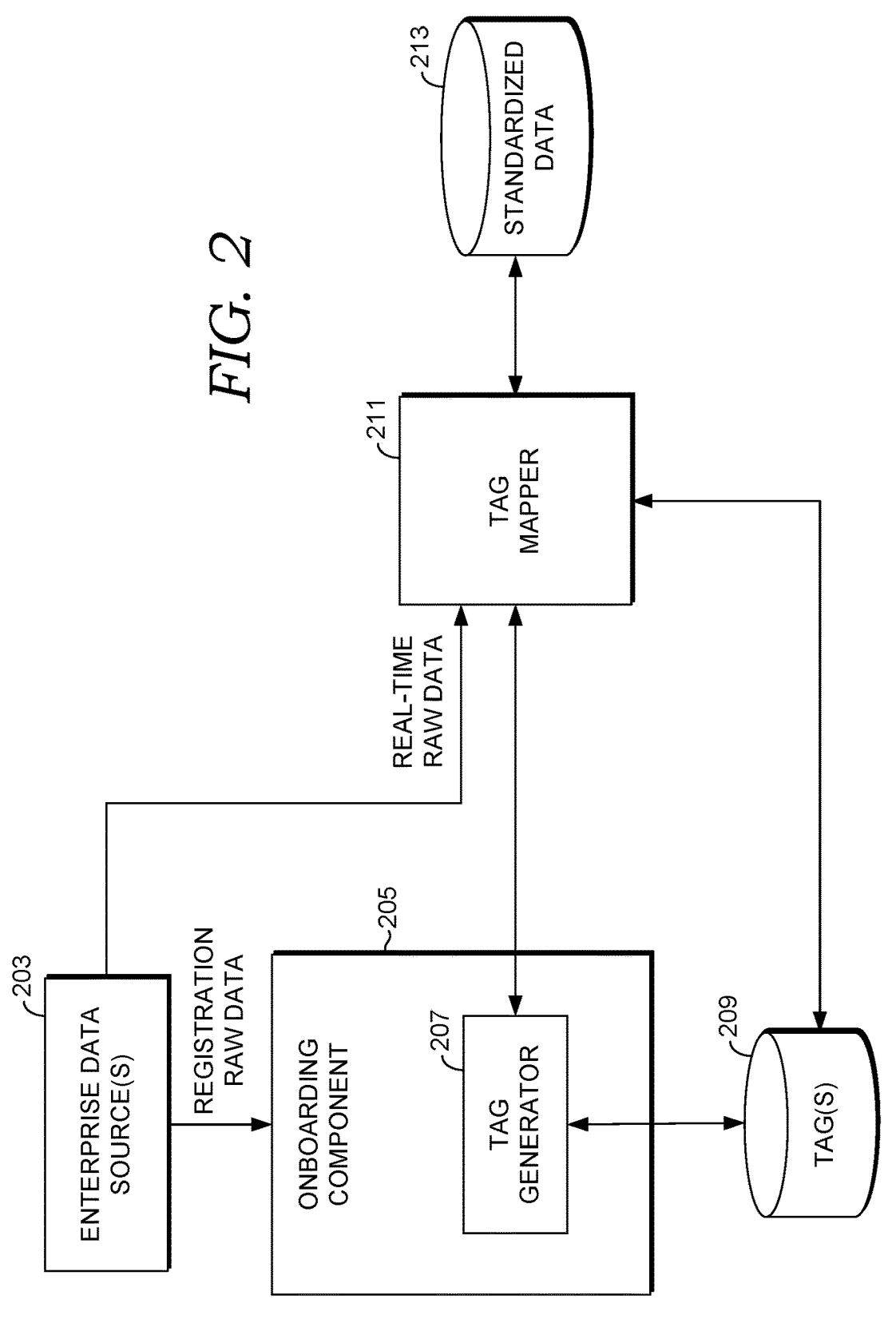
FIG. 2 is a schematic diagram of an example pipeline for mapping raw data to a computer-readable tag for data standardization, according to some embodiments.

FIG. 2 is a schematic diagram of an example pipeline 200 for mapping raw data to a computer-readable tag for data standardization, according to some embodiments. In some embodiments, the pipeline 200 is included or represents one or more portions of the system 100 of FIG. 1. For example, in some embodiments, the enterprise data source(s) 203 represents or includes the accounting system 120, the central reservation system 122, the revenue management system 124, the online travel agency system 126, and/or the reservation system 128 of FIG. 1. Likewise, in some embodiments, the tag generator 207 and the tag mapper 211 are included in the tag component 130 of FIG. 1. Likewise, in some embodiments, the standardized data 213 and/or the tag(s) 209 represent or are included in the central repository 140 of FIG. 1.

The pipeline 200 initiates when the onboarding component 205 receives registration raw data from the enterprise data source(s) 203. Registration raw data may include any suitable data used to register or onboard an enterprise, such as a name of an enterprise (e.g., a hotel, bank, or retailer), a name or identifier of each department that an enterprise has, and/or each department's current raw data, and/or any suitable business knowledge (e.g., naming conventions). Additional or alternative onboarding information can include one or more of the following, email address, phone number, billing information, user preferences, such as language preferences, communication preferences (e.g., email, notifications), job title, company or organization name, demographic Information such as age group, industry, device or platform information (e.g., preferred device (e.g., desktop, mobile) and IP address or MAC address of device for notifications/messages, operating system or browser details of each system (e.g., the accounting system 120) of the enterprise, accessibility requirements), port numbers of each system, APIs for each system, etc. For example, a user may input any of this information at one of the user device(s) 170, which responsively gets uploaded to the central repository 140. In an illustrative example, a user may upload one or more databases that indicate each department of the enterprise and the enterprise's current raw data for each department, such as sales data of a marketing department for day 1, the corresponding enterprise name, and device information (e.g., including port numbers to each department, APIS, databases) so that the normalization system 114 can communicate with the systems of the enterprise.

The tag generator 207 is generally responsible for generating one or more computer-readable tags based on one or more pieces of the registration raw data received from the enterprise data source(s) 203. In some embodiments, generating a tag includes encoding or converting one or more pieces of data of the registering raw data from the enterprise data source(s) 203 into one or more computer-readable tags. For example, using the illustration above, if there was specific customer churn data received for a marketing department of hotel enterprise A, embodiments may first generate a first tag representing the department name, such as MD (representing marketing department) and CCH (representing customer churn). The tag generator 207 may generate a tag in any suitable manner, such as via hand-coded rules or via NLP. For example, a programming conditional statement (e.g., an "if-then" statement) may specify that if the registration raw data of a particular account/enterprise has one or more (e.g., a threshold amount) of following words "marketing department, churn, sales, omni-channel, Key Performance Indicators (KPI), Return on Investment (ROI), conversion rate, retargeting, ads," then a predefined tag MD representing a marketing department should be generated. In some embodiments, certain words are weighted higher than others for making a tag generation decision. For example, explicit text such as "marketing department" may be weighted highest, whereas "ads" is weighted lowest, since marketing department is explicitly indicated, as opposed to indirect language. Continuing with this example, another programming conditional statement may specify that if raw data of the marketing department has one or more (e.g., a threshold quantity) of the following words, "churn, churn rate, customer retention, Customer Lifetime Value (LTV), churn prediction, churn mitigation, churn management, churn analysis, churn prevention strategies, net churn, or churn metrics," then a tag CCH representing customer church should be generated. In some embodiments, the tag generator 207 combines the marketing department tag and the customer churn tag (or any other suitable department and its raw data). For example, the two tags described above may be combined to formulate a single tag MDCCH, which indicates that the department is marketing and the piece of data corresponds to customer churn.

The tag generator 207 is further responsible for storing or causing storage of the generated tags 209. In some embodiments, the tag generator 207 additionally stores raw data in association with the tag(s) 209. For example, the tag generator 207 may send an instruction to store the MDCCH tag in computer memory, where a pointer is stored between the MDCCH tag and its corresponding registration raw data, which may be used for further analysis by the tag mapper 211, as described in more detail below.

In some embodiments, the tag generator 207 additionally employs functionality to convert one or more pieces of the registration raw data to machine-readable text before storage to the tag(s) 209. For example, in some embodiments, if some of the raw data includes images of text, the tag generator 207 performs Optical Character Recognition (OCR) on the image. In some embodiments, OCR includes the following functionality: an OCR component may perform image quality functionality to change the appearance of the image data by converting one or more color image frames to greyscale, performing desaturation (removing color), changing brightness, changing contrast for contrast correctness, and/or the like. Responsively, the OCR component may perform a computer process of rotating one or more image frames to a uniform orientation, which is referred to as "deskewing" the image. In some instances, image frames are slightly rotated or flipped in either vertical or horizontal planes and in various degrees, such as 45, 90, and the like. Accordingly, some embodiments deskew the image to change the orientation of the image for uniform orientation (e.g., a straight-edged profile or landscape orientation). In some embodiments, in response to the deskew operation, some embodiments remove background noise (e.g., via Gaussian and/or Fourier transformation). In many instances, one or more image frames contain unnecessary dots or other marks. In order to be isolated from the distractions of this meaningless noise, some embodiments clean the images by removing these marks. In response to the removing the background noise, some embodiments extract the natural characters from the image and place the extracted characters in another format, such as JSON. Formats, such as JSON, may be used as input for other machine learning models, such as any of the machine learning models described herein.

The tag mapper 211 is generally responsible for receiving and processing real-time raw data from the enterprise data source(s) 203 by automatically mapping the real-time raw data to the one or more tags generated by the tag generator 207 and/or one or more new tags (e.g., representing new/ added departments since onboarding). The tag mapper 211 may then output the mapped data to the standardized data 213 (e.g., via the standardization component 138). For example, using the illustration above, a user device of the user device(s) 170 may receive an update to customer churn for the enterprise hotel A, such as the next week's churn enterprise data after day 1 described above. In response to the user uploading this information to a user interface, the underlying marketing system (e.g., the accounting system 120) responsible for such data, responsively, automatically, and in near real-time transmits such real-time raw data to the normalization system 114 and the tag mapper 211 automatically and responsively maps the real-time raw data to the same tag by generating a query and/or otherwise retrieving and accessing the same generated tag in the tag(s) 209. For example, the tag mapper 211 may use or represent a machine learning or other model that tokenizes, and numerically embeds (e.g., in vectors) the raw data to classify which tag the real-time raw data belongs to within the tag(s) 209.

In some embodiments, however, none of the tag(s) 209 represents the real-time raw data received from the enterprise data source(s) 203. For example, the real-time raw data might correspond to one or more new departments for which a tag has not been generated yet by the tag generator 207. In these embodiments, using the illustration above, a user device of the user device(s) 170 may receive user input such as spa maintenance costs for building a new spa at hotel enterprise A, which corresponds to a new department (e.g., spa). In response to the user uploading this information to a user interface, the underlying system (e.g., a spa management system) responsible for such data, responsively, automatically, and in near real-time transmits such real-time raw data to the normalization system 114 and the tag mapper 211 automatically and responsively maps the real-time raw data to a new tag by programmatically calling the tag generator 207 to generate a tag in association with hotel enterprise A. The tag generator 207 then automatically generates the tag, such as "SP" (representing a new spa department) and returns the tag back to the tag mapper 211, which then automatically stores the spa maintenance fee data in association with the new tag "SP" (e.g., a pointer is built between the SP tag and the spa fee information so that the spa information can be accessed via the SP tag) in the standardized data 213.

The tag mapper 211 identifies existing enterprises that were previously registered via the onboarding component 205 so that existing tags and/or the registration raw data can be accessed from the tag(s) 209 and/or new tags can be generated. For example, in response to a user device(s) 170 uploading updated churn information or other real-time raw data, a marketing system may cause such updated churn information to be transmitted from the user device(s) 170. When such data transmission occurs, the user device(s) 170 may communicate its MAC address, IP address, device, port number, and/or any other identifying information (e.g., enterprise ID and/or department ID as provided by the underlying application), which may have been previously entered as part of the registration raw data stored by the onboarding component 205. Using the received MAC address, for example, as input, the tag mapper 211 then retrieves or looks up (e.g., via a lookup table data structure) the MAC address in the tag(s) 209 so that all tags associated with the enterprise hotel A and customer churn can be accessed. A MAC address is a unique number assigned to a network interface such as, for example, a network interface card (NIC). These network interfaces are used in networks such as, for example, Ethernet™ and token ring networks. A NIC may also be called an Ethernet™ card. The MAC "address" is created by the manufacturer of the interface device. A standard MAC address is generally comprised of 12 alphanumeric characters. Each character is a number from 0-9 or a letter from A-F (i.e., a hexadecimal number). Sometimes colons or dashes separate the characters of a MAC address. Examples of possible MAC addresses include: 34528CF3D0B8, 34:52:8C:F3:D0:B8, 34-52-8C-F3-D0-B8, etc. In other embodiments, various unique identifiers other than MAC addresses may be used to identify a user's computing device.

The tag mapper 211 may automatically map the real-time raw data to one or more tags in any suitable manner, such as via fuzzy matching, one or more machine learning models, statistical models, natural language processing (NLP), and/ or the like. For example, fuzzy matching algorithms compare strings or data points (i.e., compare the real-time raw data with the registration raw data) based on similarity rather than exact matches. Techniques like Levenshtein distance, Jaccard similarity, or soundex algorithms can be used to measure the similarity between the real-time raw data and the registration raw data and determine if they are close enough (e.g., via Edit, Cosine, or Euclidian distance) to be mapped to the same tag or a different tag. For example, regarding Jaccard similarity, there may be a match in words between the registration raw data (e.g., churn data) and the real-time raw data (e.g., additional churn data) over some threshold, which triggers the tag mapper 211 to map the real-time raw data to a same tag that represents both the real-time raw data and the registration raw data. In this way, for example, numerical or other operations can be performed by combining the registration raw data and the real-time raw data. For example, both sets of churn data described above can be populated in a same record under a churn tag so as to consolidate the information. Additionally or alternatively, some embodiments perform one or more operations, such as add the numbers in both sets of data. For example, if there was a customer churn of 4, as indicated in the registration raw data and a customer churn of 3 indicated in the real-time raw data, particular embodiments perform NLP to understand and automatically add up these numbers to 7, representing total customer churn up to date. If the match falls outside of the threshold, then the tag mapper 211 may call the tag generator 207 to generate a new tag for the new real-time raw data to be associated with.

In another example, tokenization and normalization may additionally or alternatively occur, which includes breaking down raw data into tokens (words, phrases, etc.) and normalizing them by standardizing formats, removing stop words, or applying stemming/lemmatization or other NLP, which can help in finding similarities between the real-time raw data and the registration raw data. In yet another example, machine learning models, like clustering algorithms or classification models, can learn patterns in data (e.g., the registration raw data) and group similar data points indicated in the real-time raw data together with those found in the registration raw data. These models can thus help identify and map similar raw data to the same tag or different tag, as described in more detail below.

In yet another example, the tag mapper 211 may alternatively or additionally uses probabilistic techniques that assign probabilities to the likelihood of two pieces of data from the real-time raw data and the registration raw data being related or similar, which can aid in mapping similar data to the same tag based on these probabilities. Establishing thresholds or tolerances for similarity levels can help decide when two pieces of data are similar enough to be mapped to the same tag or a new tag generate. This involves setting criteria for acceptable similarity levels.

In an illustrative example, the tag mapper 211 may first receive a MAC address of a registered user device, after which the tag mapper 211 maps, via a data structure, the MAC address to enterprise hotel A. The tag mapper 211 then, using an enterprise tag (i.e., that identifies an enterprise) as a key, accesses, from the tag(s) 209, the tag(s) 209 and associated registration raw data to obtain all tags and corresponding registration raw data. The tag mapper 211 then compares (e.g., via fuzzy matching) the real-time raw data to the real-time raw data to either map the new real-time raw data to an existing generated tag in the tag(s) 209 or generate a new tag based on the closeness of the data sets being within a threshold (e.g., Euclidian) distance. Responsive to automatically mapping the real-time raw data to one or more existing or new tags, the tag mapper 211 then automatically stores a representation of the real-time raw data and/or corresponding tag(s) within the standardized data 213 (e.g., by converting the real-time raw data into a standardized format). In some embodiments, the tag mapper 211 additionally causes or calls a component to cause display at the one or more user devices 170, of the tags and/or standardized real-time raw data processed by the tag mapper 211.

FIG. 3 is a schematic diagram of an example data structure 300 illustrating how certain words of raw data are mapped to particular tags, according to some embodiments.

In some embodiments, the data structure 300 represents how the tag generator 207 generates tags. In some embodiments, the data structure 300 represents any suitable data structure, such as a mapping dictionary or a reference table (e.g., a lookup data structure and/or a hash map).

The data structure 300 includes three columns or attributes 302, 304, and 306. The "raw data contains" column 302 includes all the key natural language words that the tag generator 207 searches for in the registration raw data. As described herein, in some embodiments, the raw data attribute 302 contains only representations of the received raw data because the raw data has first been standardized in a single standardize format (e.g., via the standardization component 138). In this way, the normalization system 114, for example, can perform a computer read of all the data regardless of the format it was received in because it has all been standardized in a single format. If a threshold quantity (e.g., 1 or 3) of such natural language words are present, then such raw data is mapped to a corresponding department and sub-department category (via column 304), and corresponding tag (via column 306). For example, regarding record or entry 308, if the words Net Present Value (NPV), amortization, cash flow analysis, and/or Capital Expenditure (CapEx), are present in raw data, then particular embodiments map this raw data to the Capital Expenditure category of the Financial Department. Responsively, a tag "FDCE" is generated, where FD represents "Financial Department" and "CE" represents "Capital Expenditure." CapEx funds are used to acquire, upgrade, or maintain physical assets. NPV is the difference between the present value of cash inflows and outflows over time for a CapEx project. Amortization is the spreading of the cost of an intangible asset over its useful life.

The other records/entries of the data structure 300 process raw data in an identical fashion. For example, the tag generator 207 may search for the terms RevPAR (revenue per available room), occupancy rate, ADR, room revenue, and room type mix. If one or more of these natural language words are found, then the tag generator 207 maps the corresponding data to a "Rooms Department" and "RevPAR" and corresponding tag RORP, where "RO" represents the "Rooms Department" and "RP" represents RevPAR. RevPAR is a performance metric calculated by dividing total room revenue by the total number of available rooms. Occupancy rate is the percentage of rooms that are occupied during a specific period. ADR (Average Daily Rate) is the average revenue generated per occupied room in a day. Room type mix identifies a distribution of different types of rooms (e.g., standard, deluxe, suites) within the hotel's inventory.

Similarly, the words "now show," "early cancellation," "late cancellation," and "non-refundable" are mapped to the reservations department under the "cancelation" category, where "RD" represents the reservations department and "CA" represents the "cancelation" category. Likewise, the words "booking engine," "commissions structure," and "aggregator" are mapped to the reservations department in the "online travel agency" category, where "OT" represents the online travel agency category. A "booking engine" specifies the software used on the hotel website that enables guests to make reservations directly. The "commissions structure" is the arrangement determining how much online travel agencies charge hotels or service providers for bookings. An "aggregator" is an online platform that gathers and displays travel-related information, such as hotels, flights, and car rentals, from multiple sources. Similarly, the words "haircut," "highlights," "pedicure," "manicure," "waxing,"

"facial," "scalp," and "extension" are mapped to the "Spa & Golf Department," under the "Salon & Body" category, where the letters "SG" represent the 2Spa & Golf Department and the letters "SB" represent the "Salon & Body" category.

In some embodiments, the data structure 300 (and/or another data structure) contains another field/column/attribute that contains each value of the raw data (or standardized raw data) for each corresponding entry. For example, entry 308 may contain another column for the standardized raw data so that such standardized raw data, along with the corresponding tag FDCE can be accessed, in computer memory, by the tag mapper 211 for comparison with real-time raw data, as described herein.

Figure 4:
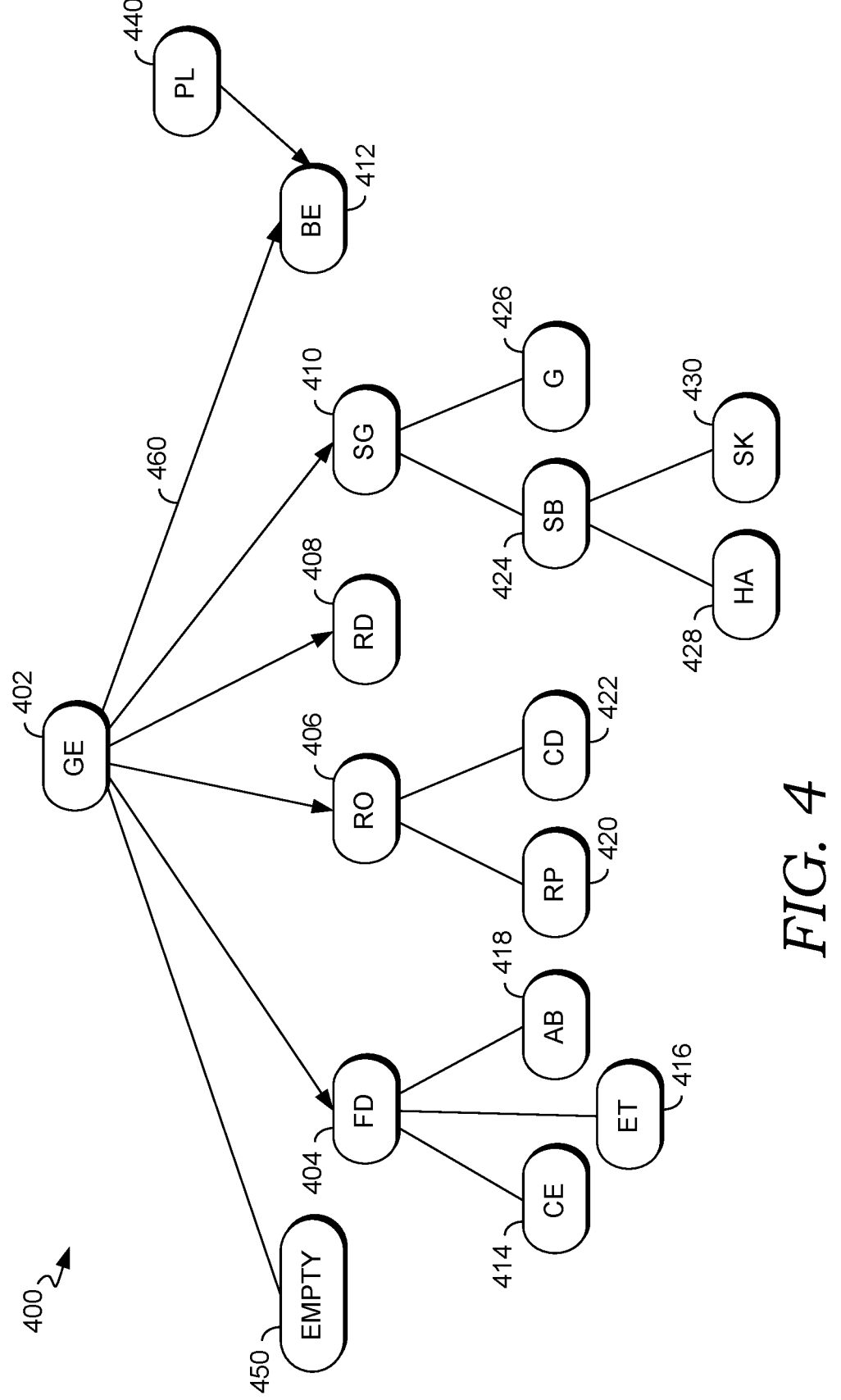
FIG. 4 is a schematic diagram of an example tree structure illustrating different tags and sub-tags and their hierarchical relationship, according to some embodiments.

FIG. 4 is a schematic diagram of an example tree structure 400 illustrating different tags and sub-tags and their hierarchical relationship, according to some embodiments. The tree structure includes nodes 402, 404, 406, 408, 410, 412, 440, 414, 416, 418, 420, 422, 424, 426, 428, and 430 (each of which represents an individual tag) and corresponding edges (e.g., edge 460), which indicates how the tags are hierarchically related. In some embodiments, the tree structure 400 represents what the tag generator 207 generates 207 when a tag is generated and/or how raw data is mapped to a tag via the tag mapper 211 of FIG. 2. The root nodes are 402 and 440, each of which represent a tag that identifies an individual enterprise (e.g., a Corporation). The intermediate nodes 404, 406, 408, 410, and 412 represent particular departments of a respective enterprise. For example, node 404 may be a tag that represents a finance department, node 406 may be a tag that represent a rooms department, node 408 may be a tag that represents a revenue department, node 410 may be a tag that represents a spa and golf department, and the node 412 may be a tag that represents a benchmarking department, which shares the same tag identifier belonging to the node 440 representing a tag identifying a different enterprise.

The leaf nodes 414, 416, 418, and 422 and second level intermediate nodes 424 and 426 represent tags identifying individual categories or sections within respective departments. For example, for the finance department or node 404, there may be a category "capital expenditure" represented by node 414 and another category "EBIT" represented by node 416. The leaf nodes 428 and 430 represent tags of sub-categories of the department categories represented by nodes 424 and 426.

In an example illustration of how the tree structure 400 may be used, the tag mapper 211 may walk the tree structure 400 walking first from the relevant root node (e.g., node 402), through the intermediate nodes, and/or then the leaf nodes if they are needed. For example, in response to identifying an enterprise based on matching a user device MAC address to an enterprise tag (as generated by the onboarding component 205), the tag mapper 211 may then find a matching enterprise tag at the node 402. The tag mapper 211 may then determine all the departments belonging to the enterprise by walking the tree structure 400 to find intermediate nodes 404, 406, 408, 410, and/or 412. In some embodiments, each node references corresponding registration raw data registered by the onboarding component 205. In response to walking the tree structure 400, the tag mapper 211 accesses or retrieves the corresponding registration raw data using the corresponding node as a key or reference and then compares the registration raw data to the real time raw data, as described above with respect to FIG. 2.

As illustrated in FIG. 4, particular embodiments generate an empty instance or node 450 so that the tag mapper 211 can populate the instance 450 at runtime or when real-time raw data is received. For example, the empty instance 450 may be an empty field representing a future department to be added to the enterprise. In this way, for example, when a new department is added, the tag mapper 211 can automatically generate a node in place of the empty instance 450 and store corresponding real-time data in association therewith.

As illustrated in FIG. 4, in some embodiments, a tag, such as represented by node 412, may be shared among or between different enterprises. In FIG. 5, nodes 402 and 440 representing different enterprises share the same tag BE corresponding to node 412. This may be the case even though the two departments may be natively labeled differently on their respective platforms. For example, the enterprise represented by tag GE may have a department called "recreation," which includes spa services, horseback riding, golf, and tennis. However, the other enterprise represented by node 440 may have those split up into separate departments, where one department is "golf" and another department is "sports." In this case, particular embodiments generate a tag representing all of these departments from different enterprises under a single tag, such as "outdoors."

FIG. 5 is a screenshot of an example user interface table 500, according to some embodiments. In some embodiments, the screenshot represents what is displayed to the user device(s) 170 in response to the normalization system 114 normalizing raw data and storing to the central repository 140. The table 500 includes columns 502, 503, 504, 506, 508, 510, 512, 514, 516, 518, 520, 522, 524, 526, and 528. In various embodiments, the table 500 is only transmitted or displayed to user devices of hotel management users and not user devices of hotel enterprises themselves or any customer of the hotel.

The "ID" column 502 represents a particular record or entry. The "PID" column 503 represents a "parent ID," which is used for consolidating different accounts or categories/sections of a department together. For example, if there are 5 different types of room revenue, and the user wants a total of room revenue, the total room revenue can be represented by its PID. The "tag" column 504 includes an identifier representing a consolidated/grouped first round of tags, such as an identifier that identifies all enterprise specific tags (e.g., all of the tags 402, 404, 406, 408, 410, 412, 414, 416, 418, 420, 422, 424, 426, 428, and 430). The "sort" column 506 is selectable to allow a user to sort the columns and/or results any way the user wishes.

The "class" column 508 represents a particular department ID or tag (e.g., node 404 of FIG. 4) of a particular department of an enterprise. The "subclass" column 510 represents a particular category/section or tag (e.g., node 416 of FIG. 4) of the particular department indicated in column 508. The "account" column 512 represents a particular account department ID (i.e., an "account"). For example, an account or the accounting department in a hotel is responsible for managing the financial aspects of the hotel. This department deals with particular sub-categories, such as financial transactions, bookkeeping, budgeting, payroll, accounts payable and receivable, financial reporting, taxation, and ensuring compliance with financial regulations. The accounting department keeps track of the hotel's financial health, prepares financial statements, and provides valuable data for decision-making by the hotel management. The "name" column 514 represents a name or ID of a sub-category of the department indicated in column 508. The "types" column 516 represents a type of tag. For example, the tag "TOT" represents total account (e.g., The "formula" tag 518 represents a formula input by a user so that the application that includes the table 500 can perform one or more calculations on the raw data received, such as account data. The "Stat Acct" column 520 represents the state of an account. The "POR 1" and "POR 2" columns 522 and 524 allow account data to be grouped together and compared for individual reports (which may be sent to user device of individual enterprises, such as hotels). For example, embodiments can automatically sum up account expense totals from each of the individual categories (e.g., financial transactions, bookkeeping, budgeting, payroll, accounts payable and receivable, financial reporting, taxation), and the output may be viewable in these columns. The "Alternative tag 1" and "Alternative tag 2" columns 526 and 528 represents a second round of tags or those tags that have been normalized between each client (e.g., they are not enterprise specific, but may, for example, be shared with other enterprises). For example, as described above, some clients may include different services for their "recreation" department, but each recreation department's raw data of each enterprise may be mapped to the same tag, which is indicated in these column 526 and/or 528.

Figure 6:
FIG. 6 is a schematic diagram illustrating how a neural network generates one or more tags, according to some embodiments.

FIG. 6 is a schematic diagram illustrating how a neural network 605 generates one or more tags, according to some embodiments. In some embodiments, the neural network 605 represents what is used by or included in the tag mapper 211 of FIG. 2. In some aspects the neural network 605 represents or includes any suitable model functionality, such as supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a backpropagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

The neural network 605 is modeled as a data flow graph (DFG), where each node (e.g., 621) in the DFG is an operator with one or more input and output tensors, such as 620 and 622. A "tensor" (e.g., a vector) is a data structure that contains values representing the input, output, and/or transformations processed by the operator. Each edge of the DFG depicts the dependency between the operators. Neural network 605 includes an input layer, an output layer and one or more hidden layers. An Input layer is the first layer of the neural network 605. The input layer receives pre-processed (e.g., via the pre-processing 604 or 616) input data represented by 603 and 615, such as one or more natural language characters (e.g., raw data describing individual department's data). The Output layer is the last layer of neural network 605. The output layer generates one or more inferences in the form of clustering, regression, classifications, or the like, which can either be hard classification (e.g., the tag is "FDCE") or soft probabilities (e.g., 50% likely that the tag is "FDCE"), which is represented by the predictions 609 and 607. Neural network 605 may include any number of hidden layers. Hidden layers are intermediate layers in neural network 605 that perform various operations.

Each node in FIG. 6, such as node 621, is associated with or includes one or more activation tensors, such as input tensor 620, output tensor 622, and/or intermediate tensors. An "activation tensor" is a tensor that is an input, intermediate, and/or output to at least one neural network layer (e.g., as modeled going from left to right), as illustrated by the flow of data from input tensor 620 to output tensor 622. This is different than a weight tensor, such as 624, where weight tensors are modeled as flowing upward (not being actual inputs or outputs). In other words activation tensors represent some form of the neural network inputs 603 and 615. For example, the input tensor 620 or node 621 can represent whether particular words in the raw data (or standardize raw data) were present in an input, whereas a weight tensor represents the weight values indicating node activation/inhibition values.

Each node in the network 605 may also be associated with or include and/or one or more weight tensors (e.g., 624), which include weight values. A "weight" in the context of machine learning may represent the importance or significance of a feature or feature value for prediction. For example, each feature (e.g., particular words of the input(s) 615) may be associated with an integer or other real number where the higher the real number, the more significant the feature is for its prediction. In one or more aspects, a weight in a neural network represents the strength of a connection between nodes or neurons from one layer (an input) to the next layer (a hidden or output layer). A weight of 0 may mean that the input (e.g., the input tensor 620) will not change the output (e.g., the output tensor 622), whereas a weight higher than 0 changes the output. The higher the value of the input or the closer the value is to 1, the more the output will change or increase. Likewise, there can be negative weights. Negative weights may proportionately reduce the value of the output. For instance, the more the value of the input increases, the more the value of the output decreases. Negative weights may contribute to negative scores. For example, particular natural language sequences (e.g., as illustrated in the "raw data contains" column 302, such as "EBIT") may be highly correlated with a specific tag and so neural network layers or nodes representing "EBIT" may be weighted higher so that that this data is activated or taken into account when making a final prediction score/token, such as a tag FDET.

Each node of the neural network 605 may additionally perform one or more functions using the activation tensors and weight tensors, such as activation functions, matrix multiplication, normalization, or the like. In some aspects, the nodes in the neural network 605 are fully connected or partially connected. In some aspects, node 621 applies a weight tensor 624 to the input tensor 620 via a linear operation (e.g., matrix multiplication, addition, scaling, biasing, or convolution). All other nodes in the neural network may perform identical functionality. In some aspects, the result of the linear operation is processed by a non-linear activation, such as a step function, a sigmoid function, a hyperbolic tangent function (tan h), and rectified linear unit functions (ReLU) or the like. The result of the activation or other operation is an output tensor 622 that is sent to a subsequent connected node that is in the next layer of neural network 605. The subsequent node uses the output tensor 622 as the input activation tensor to another node.

Each of the functions in the neural network 605 may be associated with different coefficients (e.g., weights and kernel coefficients) that are adjustable during training. For example, after preprocessing 616 (e.g., normalization, feature scaling and extraction) in various aspects, the neural network 605 is trained using one or more data sets of the preprocessed training data inputs 615 in order to make acceptable loss training predictions at the appropriate weights to set the weight tensors. This will help later at deployment time to make correct inference predictions 609.

In one or more aspects, learning or training (which also includes "tuning" as described herein) includes minimizing a loss function between the target variable (for example, a prediction indicating an incorrect token) and the actual predicted variable/ground truth (for example, a prediction indicating a correct token). Based on the loss determined by a loss function (for example, Mean Squared Error Loss (MSEL), cross-entropy loss, etc.), the loss function learns to reduce the error in prediction over multiple epochs or training sessions so that the neural network 605 learns which features and weights are indicative of the correct tags, given the inputs 615. Accordingly, it is desirable to arrive as close to 100% confidence in a particular classification or inference as much as possible so as to reduce the prediction error. In an illustrative example, the neural network 605 learns that for a given set of natural language characters A (e.g., "EBIT," "operating income," "gross profit," "EBITDA," "operating margin"), the correct classification is a particular tag "FDET" indicative of an EBIT financial department category.

Subsequent to a first round/epoch of training, the neural network 605 makes predictions with a particular weight value, which may or may not be at acceptable loss function levels. For example, the neural network 605 may process the pre-processed training data inputs 615 a second time to make another pass of predictions. This process may then be repeated over multiple iterations or epochs until the weight values in the weight tensors are adjusted and learned for optimal or correct predicted values (for example, by maximizing rewards and minimizing losses) and/or the loss function reduces the error in prediction to acceptable levels of confidence.

Continuing with FIG. 6, in some aspects, the neural network 605 is trained in a supervised manner using annotations or labels, which represent classifications using a classification model. In an illustrative example, in some aspects, training includes (or is preceded by) annotating/labeling training data 615 with responding tags so that the neural network 605 learns associations between the features or weights and corresponding labels, which is used to change the weights/neural node connections for future predictions. For example, some embodiments receive a first set of natural language characters (e.g., "booking engine," "commissions structure," and "aggregator") at a first time. Responsively, programmers (e.g., as part of the onboarding process via the onboarding component 205) then label one or more of these terms with a particular tag (e.g., "RDOT" representing an online travel agency category of a reservations department). Such process can repeated for various subsequent times, natural language characters, and tokens so that relationships between different tokens and natural language characters can be learned. Specifically, the neural network 605 can learn which weights or features (e.g., words in raw data, such as "haircut") and their corresponding natural language sequences are indicative of a particular tag (e.g., "SBGSB"). As such, the neural network 605 accordingly adjusts the weights (the weight tensors) or deactivates nodes such that certain nodes corresponding to certain natural language characters are activated and other nodes corresponding to other natural language characters are inhibited to make the training prediction(s) 607.

In one or more aspects, subsequent to the neural network 605 training, the neural network 605 (for example, in a deployed state) receives one or more of the pre-processed deployment input(s) 603. When a machine learning model is deployed, it has typically been trained, tested, and packaged so that it can process data it has never processed. Responsively, in one or more aspects, the deployment input(s) 603 (i.e., the real-tine raw data) are fed to the neural network 605, which then uses the same weight tensors (e.g., 324) that were learned via training so that the neural network 605 can produce the correct inference predictions 609. For example, the input tensor 620 can include new values (e.g., new words indicated in 603), which is then multiplied or otherwise combined with the weight tensor 624, representing the same weight values learned at training, in order to make the inference prediction(s) 609.

In some embodiments, the training data input(s) 615 represent one or more pieces of the registration raw data passed from the enterprise data source(s) 203 to the onboarding component 205 as described and illustrated with respect to FIG. 2. Likewise, in some embodiments, the deployment input(s) 603 represents the real-time raw data passed from the enterprise data source(s) 203 to the tag mapper 211 as described an illustrated in FIG. 2. In some embodiments, the inference prediction(s) 609 represent the tag(s) generated or accessed by the tag component 130 of FIG. 1 and/or the tags generated/accessed by the tag mapper 211 of FIG. 2.

Figure 7:
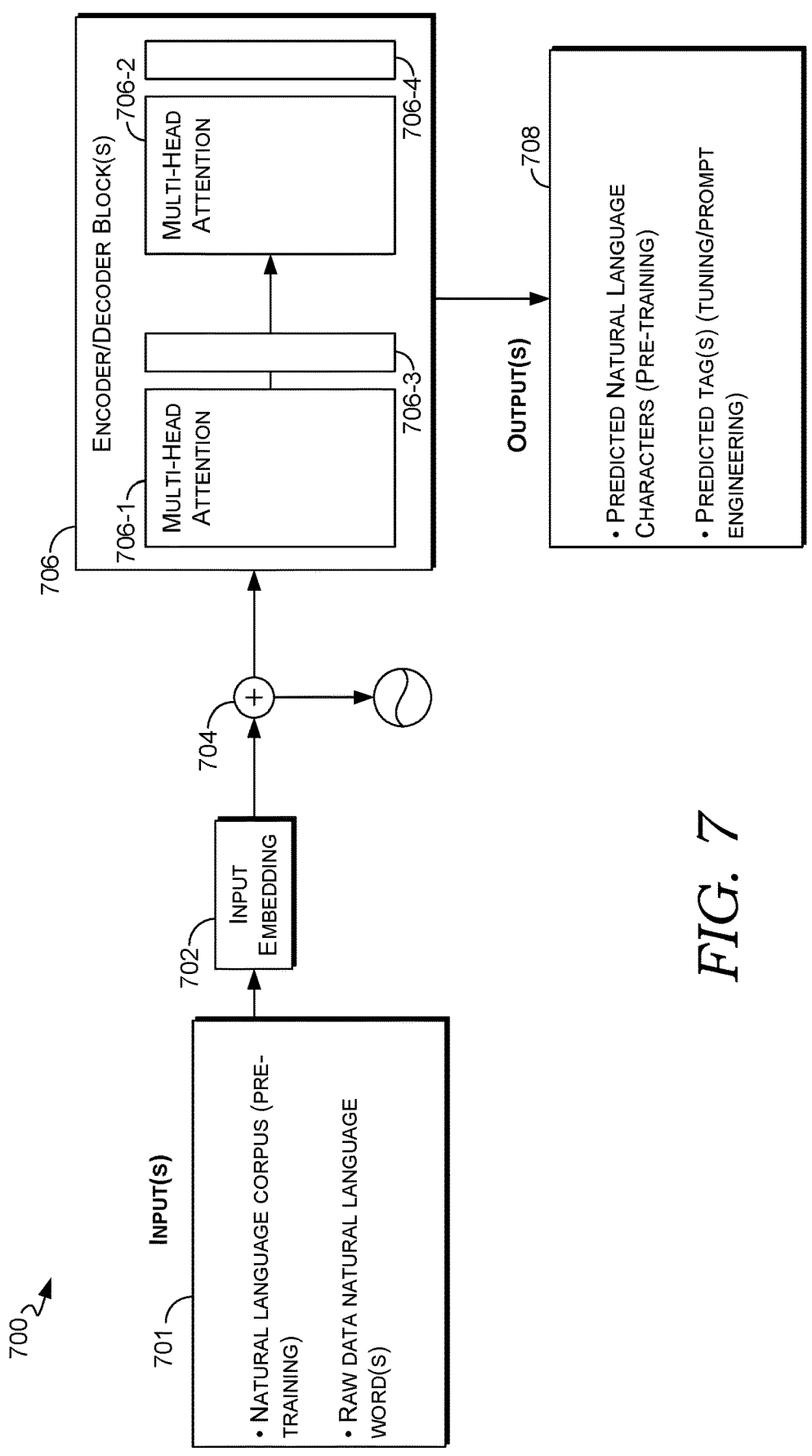
FIG. 7 is a block diagram of a Large Language Model that uses particular input(s) to generate particular tag(s), according to some embodiments.

FIG. 7 is a block diagram of a Large Language Model 700 (e.g., a BERT model or GPT-4 model) that uses particular input(s) to generate particular tag(s), according to some embodiments. In some embodiments, this model 700 represents or includes the functionality as described with respect to the tag mapper 211 of FIG. 2 and/or the neural network 605 of FIG. 6. In various embodiments, the LLM 700 includes one or more encoders and/or decoder blocks 706 (or any transformer or portion thereof).

At a first time, the inputs 701 (e.g., the real-time raw data of FIG. 2) are converted into tokens and then feature vectors are embedded into an input embedding 702 (e.g., to derive meaning of individual natural language words (for example, English semantics) during pre-training). In some embodiments, each word or character in the input(s) 701 is mapped into the input embedding 702 in parallel or at the same time, unlike existing long short-term memory (LSTM) models, for example. The input embedding 702 maps a word to a feature vector representing the word. But the same word (for example, "apple") in different sentences may have different meanings (for example, a device versus a piece of fruit). This is why a positional encoder 704 may be implemented. A positional encoder 704 is a vector that gives context to words (for example, "apple") based on a position of a word in a sentence. For example, with respect to a message "I just sent the document," because "I" is at the beginning of a sentence, embodiments may indicate a position in an embedding closer to "just," as opposed to "document." Some embodiments use a sign/cosine function to generate the positional encoder vector 704 as follows:

$$PE_{(pos,2i)} = \sin\left(pos/10000^{2i/d_{model}}\right)$$

$$PE_{(pos,2i+1)} = \cos\left(pos/10000^{2i/d_{model}}\right)$$

After passing the input(s) 701 through the input embedding 702 and applying the positional encoder 704, the output is a word embedding feature vector (e.g., a 1D numerical sequence), which encodes positional information or context based on the positional encoder 704. These word embedding feature vectors are then passed to the encoder and/or decoder block(s) 706, where it goes through a multi-head attention layer 706-1 and a feedforward layer 706-2. The multi-head attention layer 706-1 may be responsible for focusing or processing certain parts of the feature vectors representing specific portions of the input(s) 701 by generating attention vectors. For example, in Question Answering systems, the multi-head attention layer 706-1 determines how relevant the ith word (or particular letter or letter sequence of a tag) is for answering the question (e.g., "what is the token for this raw data set") or relevant to other words in the same or other blocks, the output of which is an attention vector. For every word, some embodiments generate an attention vector, which captures contextual relationships between other words in the same sentence or other sequence of characters. For a given word, some embodiments compute a weighted average or otherwise aggregate attention vectors of other words that contain the given word (for example, other words in the same line or sentence) to compute a final attention vector.

In some embodiments, a single headed attention has abstract vectors Q, K, and V that extract different components of a particular word. These are used to compute the attention vectors for every word, using the following formula:

$$Z = \text{softmax}\left(\frac{Q.K^T}{\sqrt{\text{Dimension of vector } Q, K \text{ or } V}}\right) \cdot V$$

For multi-headed attention, there may be multiple weight matrices Wq, Wk and Wv, so there are multiple attention vectors Z for every word. However, a neural network may only expect one attention vector per word. Accordingly, another weighted matrix, Wz, may be used to make sure the output is still an attention vector per word. In some embodiments, after the layers 706-1 and 706-2, there is some form of normalization (for example, batch normalization and/or layer normalization) performed to smoothen out the loss surface making it easier to optimize while using larger learning rates.

Layers 706-3 and 706-4 represent residual connection and/or normalization layers where normalization re-centers and re-scales or normalizes the data across the feature dimensions. The feedforward layer 706-2 is a feed forward neural network that is applied to every one of the attention vectors outputted by the multi-head attention layer 706-1. The feedforward layer 706-2 transforms the attention vectors into a form that may be processed by the next encoder and/or decoder block for making a prediction at 708. For example, given that a tag includes first natural language sequence "FD . . . " the encoder/decoder block(s) 706 predicts that the next natural language sequence will be "CE" in the tag based on past tags that include language identical or similar to the first natural language sequence.

In some embodiments, the encoder/decoder block(s) 706 includes pre-training to learn language (pre-training) and make corresponding predictions. In some embodiments, the encoder/decoder block(s) 706 learns what language and context for a word is in pre-training by training on two unsupervised tasks—Masked Language Modeling (MLM) and Next Sentence Prediction (NSP)—simultaneously or at the same time. In terms of the inputs and outputs, at pre-training, the natural language corpus of the inputs 701 may be various historical documents, such as text books, journals, web data, and/or periodicals in order to output the predicted natural language characters in 708 (not make the predictions at tuning/prompt engineering at this point). The encoder/decoder block(s) 706 takes in a sentence, paragraph, or sequence (for example, included in the input(s) 701), with random words being replaced with masks. The goal is to output the value or meaning of the masked tokens. For example, if a line reads, "please [MASK] this document promptly," the prediction for the "mask" value is "send." This helps the encoder/decoder block(s) 706 understand the bidirectional context in a sentence, paragraph. In the case of NSP, the encoder/decoder block(s) 706 takes, as input, two or more elements, such as sentences, lines, or paragraphs and determines, for example, if a second sentence in a document actually follows (for example, is directly below) a first sentence in the document. This helps the encoder/decoder block(s) 706 understand the context across all the elements of a document, not just within a single element. Using both of these together, the encoder/decoder block(s) 706 derives a good understanding of natural language during pre-training.

In pre-training, the output is typically a binary value C (for NSP) and various word vectors (for MLM). With training, a loss (for example, cross entropy loss) is minimized. In some embodiments, all the feature vectors are of the same size and are generated simultaneously. As such, each word vector may be passed to a fully connected layered output with the same number of neurons equal to the same number of tokens in the vocabulary.

In some embodiments, once pre-training is performed, the encoder/decoder block(s) 706 performs prompt engineering and/or tuning (e.g., prompt-tuning, and/or fine tuning). For example, for fine tuning, some embodiments perform a QA task by adding a new question-answering (e.g., a question-tag pair) head or encoder/decoder block in 706, just the way a masked language model head is added (in pre-training) for performing a MLM task, except that the task is a part of fine-tuning to add new input data in the input(s) 701 and adjust the weights formulated during pre-training. In other words, fine-tuning adds additional input data (i.e., the specific raw data natural language word(s) 701 that are not part of pre-training), outputs predicted tag(s), and performs additional rounds of training to further adjust weights to formulate the output(s) 708 that are not part of pre-training. For example, with respect to question-tag pairs, some embodiments mask a portion of the tag to test the model's knowledge of what each sequence in the tag belongs to what prompt/question or use a form of NSP to predict the next character in a tag in its entirety, as opposed to the next sentence or word, as would be done in pre-training.

Prompt engineering is the process of guiding and shaping ML model responses (e.g., the predicted tag(s) in the output(s) 708) by relying on the user, or prompt engineer, to craft more carefully phrased and specific queries or prompts. With prompt engineering, the weights are frozen (i.e., its values remain the same from pre-training) such that they are not adjusted during prompt engineering. A "prompt" as described herein may include one or more of: a natural language request (e.g., a question, command, or instruction (e.g., "give me a tag for this set of raw data")), one or more datasets (e.g., a particular document that includes the raw data), code snippets, mathematical equations, one or more examples (e.g., one-shot or two-shot examples), a hard prompt or template, and/or a numerical embedding (e.g., a "soft" prompt). In some embodiments, an "example" is indicative of few-shot prompting, which is a technique used to guide large language models (LLMs), like GPT-3, towards generating desired outputs by providing them with a few examples of input-output pairs (e.g., raw data sets each associated with a tag).

The prompt engineering process often involves iteratively asking increasingly specific and detailed questions/commands/instructions or testing out different ways to phrase questions/commands/instructions. The goal is to use prompts to elicit better behaviors or outputs (e.g., tokens) from the model. Prompt engineers may experiment with various types of questions/commands/instructions and formats to find the most desirable and relevant model response tokens. For example, a prompt engineer may initially provide a prompt (e.g., "what token is associated with 'occupancy rate'"), where the tag is "RD" (representative of a Rooms department identifier). However, this tag may not be specific enough/or may be the wrong tag, so the prompt engineer may formulate another prompt template that states, "what tag within a particular sub-category of the rooms department is most strongly associated with "occupancy rate" and the response token may be "FDRP" (representative of the REVPAR Rooms Department). The prompt engineer may be satisfied with this prompt. Subsequent to this satisfactory answer, particular embodiments save the corresponding event data prompt as a template. In this way, the prompt template (e.g., a "hard" prompt) may be used at runtime or when the model is deployed.

Prompt tuning is the process of taking or learning the most effective prompts or cues (among a larger pool of prompts) and feeding them to the encoder/decoder block(s) 706 as task-specific context. For example, a common question or phrase—"what department or category includes data on 'aggregators'?"—could be taught to the encoder/decoder block(s) 706 to help optimize the model and guide it toward the most desirable decision or corresponding outputs in 708, such as "RDOT" (representative of an online travel agency reservations department. Unlike prompt engineering, prompt tuning is not about a user formulating a better question/command or making a more specific request. Prompt tuning means identifying more frequent or important prompts (e.g., which have higher node activation weight values) and training the encoder/decoder block(s) 706 to respond to those common prompts more effectively with tags. The benefit of prompt tuning is that it may be used to modestly train models without adding any more input(s) 701 or prompts (unlike fine-tuning), resulting in considerable time and cost savings.

In some embodiments, prompt tuning may use soft prompts only, and may not include the use of hard prompts. Hard prompts are manually handcrafted text prompts (e.g., prompt templates) with discrete tokenized tags, which are typically used in prompt engineering. Prompt templating allows for prompts to be stored, re-used, shared, and programmed. Soft prompts are typically created during the process of prompt tuning. Unlike hard prompts, soft prompts are typically not viewed and edited in text. Soft prompts typically includes an embedding, a string of numbers that derives knowledge from the encoder/decoder block(s) 706 (e.g., via pre-training). Soft prompts are thus learnable tensors concatenated with the input embeddings that may be optimized for a dataset. In some embodiments, prompt tuning creates a smaller light weight model (e.g., not the LLM 700) which sits in front of the frozen pre-trained model (i.e., the LLM 700 with weights set during pre-training). Therefore, prompt tuning involves using a small trainable model before using the LLM 700. The small model is used to encode the text prompt and generate task-specific virtual tokenized tags. These virtual tokenized tags are pre-appended to the prompt and passed to the LLM 700. When the tuning process is complete, these tokenized virtual tags are stored in a lookup table (or other data structure) and used during inference, replacing the smaller model.

Figure 8:
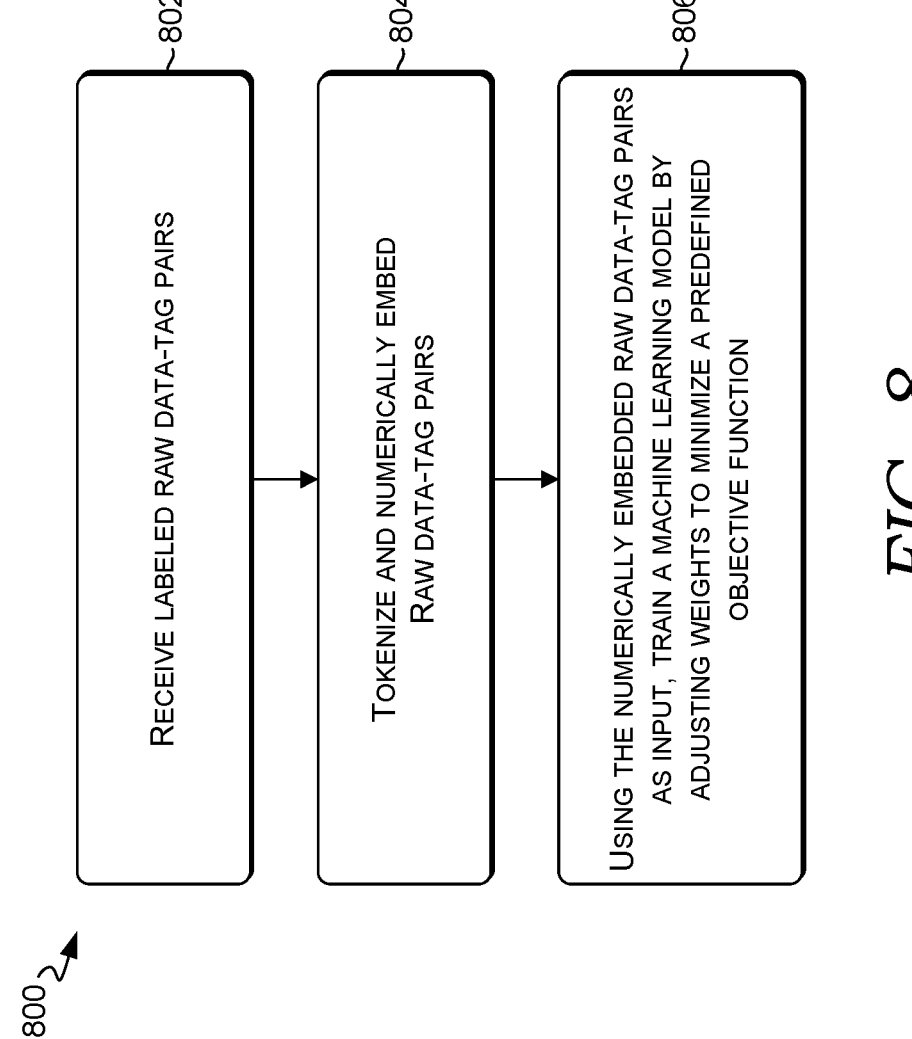
FIG. 8 is a flow diagram of an example process for training a machine learning model to produce a tag, according to some embodiments.

FIG. 8 is a flow diagram of an example process 800 for training a machine learning model to produce a tag, according to some embodiments. In some embodiments, the process 800 is how the LLM 700, and/or the neural network 605 is trained to generate a token. Per block 802, some embodiments first receive labeled raw data-tag pairs. A "raw data-tag pair" refers to a particular set of raw data (e.g., enterprise data from different enterprise departments) in a dataset that has been labeled with a particular tag. For example, referring back to FIG. 3, an EBIT financial department document (e.g., an excel spreadsheet containing EBIT data) or report that includes the words "EBIT," "operating income," "gross profit" can be labeled with the tag FDET. In some embodiments, the labeled raw data-tag pairs are generated at or as a part of onboarding time (e.g., as described with respect to the onboarding component 205) by human programmers. For example, in response to the tag generator 207 generating a respective tag, a human programmer may label the corresponding raw data set (e.g., a document, file, or report) with the corresponding tag in preparation for model training. In this way annotation does not have to be done by experts or crowdsourced workers to create meaningful pairs, which is typically required with existing machine learning models. Rather, because the tag generator 207 already generates a tag for the registration raw data (e.g., which includes a first day's worth of an enterprise's raw data, such as financial department, room department, or other department data), programmers can take the extra step of labelling the corresponding raw data so that human annotators do not have to take this step.

The "raw data" of the raw data-tag pairs may come from or represent any suitable sources, including a spreadsheet, an HTML page, a web page, an app page, a structured database, a chat thread, a text message, a website, an electronic book, a customer support log, a word processing document, or specially curated datasets designed for QA tasks. However, because tags may not be natural answers to questions, programmers or other users may have to hand-code such tags and make them pair up with a question (e.g., "which department category includes information about capital expenditure?"

Per block 804, some embodiments then tokenize and numerically embed the raw data-tag pairs. "Tokenization" is the concept of converting natural language text into tokens (words or sub-words in this context). For example, for the raw data-tag pair of a financial report 1 and a tag FDET the tokenized form may be "Net" "Present" "Value" "amortization" (all words in the financial report 1) and "FDET" (the tag). In some embodiments, the tag (e.g., "RDCA") of the raw data-tag pairs at block 802 is always a single token or word and is not broken up further. After tokenization at block 804, some embodiments responsively convert the tokenized raw data-tag pairs into numerical embeddings (vectors) using techniques like word embeddings (Word2Vec, GloVe) or contextual embeddings (BERT, GPT) to represent the semantics and context of the text. This effectively structures the data in a format suitable for the machine learning model's input requirements.

Per block 806, using the numerically embedded raw data-tag pairs as input, some embodiments train (e.g., fine-tune or prompt-tune after pre-training) a machine learning model by adjusting weights to minimize a predefined objective function. For example, using the raw data-tag pairs as ground truth and given a certain enterprise financial document as input, the model may predict a particular tag as an output response to the given enterprise financial document. The model can then compare its prediction with the actual correct tag in the raw data-tag pairs and adjust its parameters to minimize the error. In this way, the model can learn to respond to questions/raw data that are similar to the ones in the training data with the correct tags. Specifically, the training objective is for the machine learning model to predict the tag given a raw data sequence. During training, the model minimizes a loss function that measures the difference between predicted tags and the actual tags in the answer sequence (e.g., in the raw data-tag pairs). The model's parameters or weights may be updated/adjusted through techniques like backpropagation and optimization algorithms (e.g., Adam, SGD) to minimize the loss and improve the model's ability to generate accurate tags. Training can occurs over multiple iterations (epochs) with batches of raw data-tag pairs fed into the model to adjust its parameters/weights gradually.

FIG. 9 is a flow diagram of an example process 900 for normalizing different sets of raw data via tags, according to some embodiments. The process 900 (and/or any of the functionality described herein) may be performed by processing logic that comprises hardware (e.g., circuitry, hardware accelerator (e.g., AI accelerator), dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. For example, only blocks 908 and 910 (without block 902, 904, and 906) may occur in the process 900. Added blocks may include blocks that embody any functionality described herein (e.g., as described with respect to FIG. 1 through 8). The computer-implemented method, the system (that includes a processor and a storage medium), and/or a computer readable medium in association with a processor as described herein may perform or be caused to perform the process 900 or any other functionality described herein.

Per block 902, some embodiments receive, over a computer network (e.g., the network(s) 160 of FIG. 1), first raw data from one or more network devices, where the first raw data represents data from departments of a first enterprise. An "enterprise" as described herein refers to any suitable business organization, such as a corporation, non-profit organization, LLC, LLP, University, or the like. For example, an enterprise can be a particular hotel branch.

A "department" refers to a distinct, specialized division or segment within an enterprise that focuses on a specific function, set of tasks, or area of expertise. For example, with respect to hotel enterprises, the departments may include a finance department, a rooms department, a marketing department, a revenue management department, a property management department, an accounting department, a reservations department, an online traveling department, a benchmarking department, a guest satisfaction department, and a recreation department. The "finance department" The finance department within an enterprise is responsible for managing the organization's financial activities and ensuring its financial health. It oversees various critical functions related to money, investments, and planning. The "rooms department" of a hotel enterprise is a division responsible for managing and overseeing everything related to guest accommodations. It focuses on ensuring guest satisfaction with their rooms and the overall lodging experience. The primary responsibilities of the Rooms Department may include reservations, front desk operations (e.g., checking guests in and out, addressing inquiries, providing information, and offering concierge services), housekeeping (e.g., managing the cleaning, maintenance, and upkeep of guest rooms, ensuring they are clean, well-maintained, and equipped with necessary amenities), guest services (e.g., providing assistance, responding to guest requests, and ensuring a high level of customer service throughout a guest's stay).

The "marketing department" within an enterprise is responsible for planning, implementing, and overseeing strategies aimed at promoting the enterprise's products or services, attracting customers, and driving business growth. Its primary focus is on understanding customer needs, creating awareness about the company's offerings, and generating demand. Key functions of a marketing department include market research, marketing strategy and planning (e.g., developing comprehensive marketing plans that outline objectives, target audiences, positioning, and tactics to achieve business goals), brand management (e.g., building and maintaining the brand identity, ensuring consistency in messaging, and fostering positive brand perception among consumers).

The "revenue management department" of an enterprise focuses on maximizing the company's revenue and profitability by strategically managing pricing, inventory, and demand. Its primary goal is to optimize revenue streams across various products, services, or channels. This department typically employs data-driven strategies and analysis to achieve its objectives. Key functions of a revenue management department include pricing strategy (e.g., developing and implementing pricing strategies that consider market demand, competition, seasonality, and customer behavior to maximize revenue, demand forecasting and analysis (e.g., using historical data, market trends, and analytics to predict future demand for products or services), inventor management (e.g., optimizing inventory levels and availability, particularly in industries where limited inventory (such as hotel rooms, airline seats, or event tickets) needs to be sold efficiently), channel management (e.g., managing distribution channels (e.g., email v. social media) and partnerships to ensure the most effective and profitable distribution of products or services), performance measurement and analysis (e.g., tracking and analyzing key performance indicators (KPIs) to evaluate the effectiveness of revenue management strategies and make data-driven decisions), advertising and Promotion (e.g., creating and executing advertising campaigns, utilizing various channels such as digital marketing, traditional media, social media, and content marketing to reach target audiences), public relations (e.g., managing relationships with the media, stakeholders, and the public to maintain a positive image and handle communication during crises or important company announcements), providing sales teams with marketing materials, collateral, and support to assist in selling products or service, maximizing room occupancy and revenue by implementing pricing strategies, managing room rates, and optimizing room inventory, and ensuring the safety and security of guests within the room areas and adhering to safety protocols and regulations.

A "property management department" oversees the operational aspects and maintenance of real estate properties on behalf of the owner or property management company. This department is responsible for various functions related to managing the property efficiently and ensuring its upkeep. Key responsibilities of a property management department include tenant relations and leasing (e.g., managing lease agreements, screening potential tenants, and addressing tenant concerns or issues), property maintenance and repairs, rent collection/distribution, property inspections and compliance (e.g., conducting regular inspections to ensure the property is in good condition), vendor and contractor Management (e.g., hiring and managing contractors, vendors, and service providers for various property-related needs such as repairs, landscaping, or cleaning services).

The "accounting department" primarily focuses on recording, summarizing, and reporting financial transactions within the organization. Its core functions include financial recording (e.g., keeping track of daily financial transactions, including purchases, sales, payments, and receipts, using systems like double-entry bookkeeping), financial Reporting (e.g., preparing financial statements such as balance sheets, income statements, cash flow statements, and statements of equity to provide a snapshot of the enterprise's financial health, auditing and compliance (e.g., ensuring compliance with accounting standards and regulations, as well as facilitating external audits to verify the accuracy of financial records), and tax compliance to ensure compliance with local laws and regulations.

The "reservations department" within a hotel is responsible for managing and facilitating the booking process for guests who wish to stay at the hotel. Its primary function is to handle reservations efficiently, ensuring accurate bookings, providing information, and coordinating guest accommodations. Key responsibilities of the reservations department include: booking management (e.g., receiving and processing reservation requests through various channels (phone, email, online platforms, etc.) to secure guest accommodations, room allocation (e.g., assigning available rooms based on guest preferences, availability, and specific requests (e.g., room type, view, amenities)), rate and pricing management (e.g., providing information on room rates, packages, discounts, and special offers to potential guests while adhering to the hotel's pricing policies), customer service and information (e.g., assisting guests with inquiries related to reservations, room availability, hotel amenities, and policies), maintaining reservation systems (e.g., managing reservation databases, ensuring accuracy of guest information, and utilizing reservation software for efficient booking processes), and group reservations and events (e.g., handling bookings for group stays, conferences, events, and coordinating requirements for large groups or functions).

In the context of hotels, an "online traveling department" can refer to a specific division or team within a hotel's organizational structure that manages online bookings, digital marketing, and relationships with online travel agencies (OTAs) and other online booking platforms. This department focuses on leveraging digital channels and platforms to maximize online visibility, attract guests, and drive bookings. Key responsibilities of an online traveling department in a hotel context include: online distribution strategy (e.g., developing and implementing strategies to optimize the hotel's presence on various online travel platforms, including OTAs (like Booking.com, Expedia, etc.), the hotel's website, and other digital booking channels), channel management (e.g., managing relationships with different online booking channels, negotiating contracts, and optimizing distribution channels to maximize room bookings while maintaining profitability), collaborating with revenue management teams to ensure pricing strategies are aligned with online distribution channels and market demand, and overseeing the hotel's online booking systems, ensuring they are updated, user-friendly, and integrated with various online platforms for seamless reservations.

The "benchmarking department" conducts benchmarking activities, which involve comparing and evaluating the organization's processes, practices, performance metrics (KPIs), and strategies against those of other companies or industry standards. The primary objective is to identify areas for improvement, best practices, and opportunities for enhancing efficiency, effectiveness, and competitiveness. For example, a report can indicate the organization's performance metrics, key performance indicators (KPIs), and practices against benchmarks to identify strengths, weaknesses, and areas for improvement. Examples of KPIs include: percentage increase in sales over a specific period, monthly/Quarterly/Annual Sales Targets, Customer Acquisition Cost (CAC), Average Revenue per Customer, Customer Satisfaction Score (CSAT): Net Promoter Score (NPS), First Response Time, Customer Churn Rate, Return on Investment (ROI), Conversion Rate (e.g., Percentage of users who take a desired action (e.g., purchase an item at a hotel or book a hotel), Cost per Lead (CPL), Website Traffic, Financial Performance, Gross Profit Margin, Overall Equipment Effectiveness (OEE), Employee Turnover Rate, or the like.

A "guest satisfaction department" within a hospitality setting, particularly in hotels, focuses on ensuring that guests have a positive and fulfilling experience during their stay. While not always a distinct department, many hotels prioritize guest satisfaction as a central aspect of their operations, and various teams collaborate to achieve this goal. Key responsibilities and functions that contribute to guest satisfaction within a hotel may include: ensuring guests receive attentive and courteous service throughout their stay, addressing their needs, inquiries, and concerns promptly and effectively, providing smooth check-in and check-out processes, facilitating room assignments based on preferences, and ensuring accuracy in guest reservations, concierge services (e.g., assisting guests with recommendations, travel arrangements, restaurant bookings, and local attractions to enhance their experience), maintaining cleanliness, comfort, and functionality in guest rooms and public areas to meet or exceed guest expectations, quality assurance, implementing systems to gather guest feedback through surveys, reviews, or direct communication and using this input to address issues and improve services, training and development of staff members to enhance customer service skills, and resolving guest complaints or issues swiftly and professionally to ensure guest satisfaction and prevent negative experiences from impacting their stay.

The "recreation department" within a hospitality setting, particularly in hotels or resorts, is responsible for managing and overseeing recreational facilities and activities offered to guests during their stay. Its primary objective is to enhance guest experiences by providing a range of entertainment, leisure, and recreational opportunities. The Recreation Department aims to ensure that guests have enjoyable and memorable experiences beyond their accommodations. Key responsibilities include: overseeing and maintaining facilities such as pools, spas, gyms, sports courts, game rooms, and outdoor spaces to ensure they are safe, clean, and well-equipped, organizing a diverse range of activities and programs suitable for different age groups and interests, including fitness classes, sports tournaments, arts and crafts, and guided tours, arranging entertainment events, live music, themed nights, movie screenings, and other special events to engage guests and create a vibrant atmosphere, interacting with guests, providing information about available activities, assisting with reservations, and ensuring guests have access to necessary equipment or facilities, an implementing safety protocols, monitoring activities for adherence to safety standards, and ensuring guests are aware of safety guidelines.

It is understood that these departments are representative only and that any additionally or alternative departments may be present. For example, in the context of hotels or other enterprises, additional or alternative departments may include "front office" (handles guest check-ins, reservations, guest inquiries, and provides concierge services) "housekeeping" (responsible for cleaning and maintaining guest rooms, public areas, and ensuring overall cleanliness), "food and beverage" (manages restaurants, bars, room service, and catering for events held within the hotel), "sales and marketing" (focuses on promoting the hotel, securing bookings, managing partnerships, and advertising) "human Resources" (handles hiring, training, employee relations, and overall staff management) "maintenance and engineering" (takes care of the physical property (e.g., pool), including repairs, utilities, and technical systems), "security" (ensures the safety and security of guests, staff, and the property), "spa and recreation" (manages wellness facilities, gyms, spas, and recreational areas within the hotel), "event management" (coordinates and oversees events, conferences, weddings, and other functions hosted at the hotel).

In all of these use cases described above with respect to departments, the raw data representing various departments may come in the form of reports, documents, files, web pages, app pages, chats, database objects (e.g., joined tables), spreadsheets, PDF documents, and/or the like. The term "raw data" may be any data that is in a format native to its host system (e.g., operating system or application) or origin (e.g., a particular server). For example, native data scraped from a website may include HTML pages. A "network device" as described herein refers to any suitable device used in a network, such as a gateway device, a router, a switch, a server, a cloud computing node, or the like. In some embodiments, at least a portion of the first raw data of at least two departments come from different origins (e.g., a particular computing device, such as a server, MAC address, or IP address) or systems (e.g., a particular operating system, application, port number, etc. stored on the same origin or device) relative to each other. For example, a first portion of raw data may come from a first application on a hotel's computing device and a second portion of the raw data may come from a second application on the hotel's computing device, where the first application is written in HTML and the second application is in a PDF format, which are two different formats.

Per block 904, based at least in part on natural language included in the first raw data, some embodiments generate computer-readable tags (e.g., the tags under the "tag" column 306 of FIG. 3), where each computer-readable tag at least partially represents a respective department (i.e., represents a department itself and/or category/section within the department). In some embodiments, block 904 includes the functionality as described with respect to the tag generator 207, where, for example, the first raw data represents the "registration raw data" of FIG. 2. In an illustrative example of block 904, in some embodiments, block 904 is done automatically based on using Natural Language Processing (NLP) of the first raw data to generate the computer-readable tags. For example, in response to the receiving at block 902, some embodiments automatically tokenize (break into words and/or sub-words) the first raw data, generate Part-of-Speech (POS) tags that indicate the part of speech (e.g., noun, adverb, adjective) of each token, perform lemmatization, Named Entity Recognition (NER) (e.g., generate tags for each token indicating an entity type), semantic analysis, sentiment analysis, and/or any other NLP functionality to understand human natural language and generate a corresponding tag (e.g., via the LLM 700 of FIG. 7). Additionally or alternatively, in some embodiments, block 904 is done manually (e.g., by a programmer) based on programmed hand-coded rules (e.g., including conditional statements, functions, calls, variables, loops, comments, etc.) and further based on natural language word searching in the first raw data. For example, as described with respect to FIG. 3, given a set of raw data, some embodiments search for certain words under the "raw data contains" column 302 via fuzzy matching, TF-IDF, or the like. Alternatively or additionally, bock 904 may represent a programmer manually creating a tag based on having found certain words (e.g., those for a certain record/entry under the "raw data contains" column 302).

A "computer-readable tag" as described herein can be an identifier that identifies a particular department (e.g., "FD" in FIG. 3), department category (e.g., "EB" for EBIT in FIG. 3), any combination thereof (e.g., "FDEB" in FIG. 3) and/or any other suitable category, and can be read by a computer. In various embodiments, a computer-readable tag represents a code or other character sequence that is not recognized as a regular natural language word or sentence, includes a different character sequence that the raw data, and/or does not itself spell out a particular department or category, as illustrated, for example, by the tags in FIG. 3.

Per block 906, some embodiments store (e.g., subsequent to the generating of the computer-readable tags), at a computer storage device (e.g., RAM, a disk drive, flash memory) and in a standardized form, each computer-readable tag and the data from the departments. Prior to the storing, for example, some embodiments convert (e.g., encode) the first raw data (e.g., data that is in PDF or image format) into a standardized format (e.g., data that is in HTML tags via OCR), as described with respect to the standardization component 138 of FIG. 1. In another example, some embodiments standardize all reports, files, or other data objects contained in the first raw data so that all disparate sources, regardless of format, protocol, or structure are standardized in a single unitary format.

Per block 908, some embodiments receive (e.g., subsequent to the storing at block 906), over the computer network, second raw data from the one or more network devices. For example, as described with respect to FIG. 2, after onboarding a hotel via the onboarding component 205 (e.g., receiving registration raw data, including day 1's data from all of its departments) the tag mapper 211 may receive the hotel's real-time raw data (e.g., day 2's data from all of its departments and/or a new department).

Per block 910, in response to the receiving of the second raw data and based at least in part on the generating of the plurality of computer-readable tags, some embodiments automatically map, in near-real time, the second raw data to a first computer-readable tag. In some embodiments, the second raw data corresponds to data of a first department of the first enterprise. In some embodiments, "near real-time" is relative to at least the receiving of the second raw data at block 908. For example, as soon as the tag mapper 211 receives the real-time second raw data from the enterprise data source(s) 203, the automatic mapping occurs. In another example, near real-time relative to at least the receiving of the second raw data at block 908 can additionally or alternatively mean mapping in near real-time relative to when the second raw data was generated. For example, as soon as a user inputs and/or submits KPI information, payment information for pool and spa services, and/or maintenance repair information to a database or application (i.e., this is when the raw data was "generated"), the corresponding computing device automatically transmits such information to the normalization system 114 and the tag mapper 211 responsively and automatically maps the second raw data to the first computer-readable tag. Accordingly, "near real-time" can be relative to a time at which raw data is received and/or generated.

In some embodiments, the second raw data is first standardized (e.g., via the standardization component 130) before it is mapped. In this way, some embodiments map, in near real-time, at least a portion of the standardized data (and/or the raw data) into one or more computer-readable tags.

In some embodiments, the automatic mapping, in near-real time, of the second raw data to the first computer-readable tag at block 910 is based on training a machine learning model to generate a computer-readable tag for a given set of raw data, as described, for example with respect to the neural network 605 of FIG. 6, the LLM 700 of FIG. 7, and/or the process 800 of FIG. 8.

In some embodiments, prior to the automatic mapping at block 910, some embodiments generate the first computer-readable tag such that the first computer-readable tag is not included among the plurality of computer-readable tags generated at block 904. In these embodiments, the first department that the second raw data corresponds to represents a new department not included in any department, of the plurality of departments. Examples of this are described with respect to the empty instance 450 of FIG. 4, where, for example, embodiments can generate a new node in place of the new instance when a new department has been added. Other examples of this are described with respect to the tag mapper 211 of FIG. 2 that can call the tag generator 207 when another new tag needs to get generated.

In some embodiments, prior to the automatic mapping at block 910, some embodiments access, from the computer storage device, the first computer-readable tag. In these embodiments, the first computer-readable tag is included among the plurality of tags and the first department represent an existing department included in the plurality of departments. Examples of this are described with respect to the tag mapper 211 of FIG. 2 that can alternatively access the tag(s) 209 that were generated at onboarding time (as opposed to calling the tag generator 207 when another new tag needs to get generated).

Some embodiments receive, over the computer network, third raw data from a second network device (or a second set of network devices) not included in the one or more network devices, where the third raw data includes data of a second department of a second enterprise. An in response to the receiving of the third raw data, some embodiments automatically map, in near real-time relative to at least the receiving of the third raw data, the third raw data to the first computer-readable tag. In these embodiments, the first computer-readable tag represents a common attribute (e.g., department and/or department category) shared between at least the first department of the first enterprise and at least the second department of the second enterprise.

One example of this is described in FIG. 4 where the tag "BE" (representing a particular department) represented by node 412 is shared by two different enterprises represented by nodes 402 and 440. In another example, referring back to FIG. 1, as illustrated, hotel enterprise 152 may include a "central reservation system 122" and hotel enterprise 154 may also include a "reservation system 128." In this situation, particular embodiments may generate a single tag between both of these enterprises, such as "RS," which represents a reservation department tag. Combining different enterprises to a single tag may be useful in situations for hotel management enterprises that want to analyze all of their client's/hotel's data by category or department to identify trends or patterns for all hotels or enterprises.

Continuing with FIG. 9, some embodiments provide, over the computer network, remote access to one or more user devices such that any user can update information about the first department in near real-time through a graphical user interface. In this way, one or more users provide the updated information (e.g., the second raw data) in a non-standardized format dependent on a hardware (e.g., a particular mobile device) or software (e.g., a particular operating system) platform used at the one or more user devices. For example, in some embodiments, the one or more user devices represent user devices (e.g., a desktop device inside a hotel management company's office) of an enterprise management company that manages multiple enterprises and the graphical user interface may represent the table 500 of FIG. 5 such that enterprise management users can update/consolidate data from different tags via the implementation of formulas or other calculations, as described herein. In some embodiments, the one or more user devices alternatively or additionally represent user devices of the one or more enterprises and/or separate vendors (contracted enterprises) that are managed by the enterprise management company (e.g., tablets in a hotel enterprise). A vendor has a contractual relationship with an enterprise such that the vendor may perform a service corresponding to a department (e.g., activities at an enterprise), and each vendor may have one or more user devices. In this way, for example, hotel vendors or hotel staff, such as concierge staff, pool and spa staff, or the like may update non-standardized information from their devices, which can then be uploaded to the normalization system 114 for standardization. In some embodiments, hotel or other enterprise management staff have remote access to the hotels or enterprises devices they manage through remote access via software like TeamViewer, AnyDesk, or Remote Desktop Protocol (RDP) to connect to users' devices remotely. These tools allow hotel management staff to view and control the user's screen as if they were physically present in a hotel. In this way, for example, enterprise management staff may fix any data entry errors hotel staff made, input their own department data, and/or update or provide department information to the enterprise (e.g., provide the hotel different reports as determined via the table 500). After the user of the user device(s) uploads their information, regardless of hardware or software platform requirements, the data is standardized via the standardization component 138 of FIG. 1.

Some embodiments automatically generate a message containing the updated information about the first department whenever the updated information has been stored to the storage device and then transmit, over the computer network, the message to all user devices in near real-time such that each user has immediate access to updated information about the department. For example, if a first user device of a first enterprise updated information (e.g., inserted transaction data) in a "spa and pool" department and the normalization system 114 has stored such information to the central repository 140, the normalization system 114 may communicate, via the computer network(s) 160, such updated information to other systems of the same first enterprise, such as communicating to a second user device of the first enterprise (e.g., or of a vendor of the first enterprise) a notification that the spa and pool department has a new record with new transaction information. In this way, the message is transmitted in a standardized format over the computer network to all departments or department devices or vendors or vendor user devices that have access to the department's information so that all users can quickly be notified of any changes without having to manually look up or consolidate all of the departments' updates. This ensures that each of a group of departments of an enterprise and/or their vendors are always given immediate notice and access to changes so they can readily adapt their own strategies (e.g., ways to market a product) in accordance with other departments' data, such as KPI data. The message can be in the form of an email message, text message, or other type of message. As described herein, many departments of a hotel or other enterprise collaborate with each other to best formulate their strategies and so these notifications may be helpful.

Figure 10:
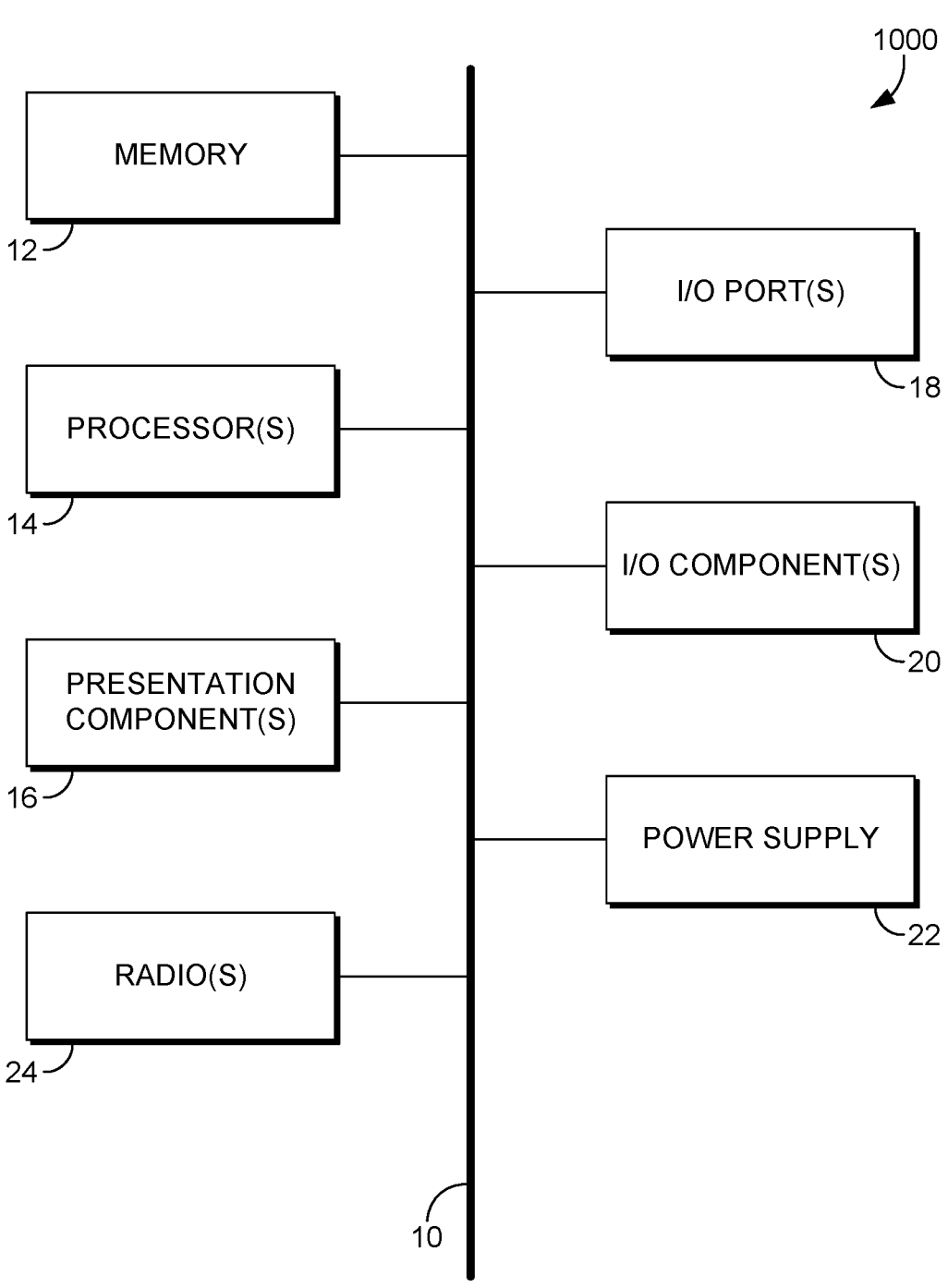
FIG. 10 is a block diagram of an example computing device suitable for use in implementing some embodiments of the present disclosure.

Turning to FIG. 10, computing device 11 includes a bus 19 that directly or indirectly couples the following devices: memory 12, one or more processors 14, one or more presentation components 16, one or more input/output (I/O) ports 18, one or more I/O components 20, an illustrative power supply 22, and a hardware accelerator 26. Bus 19 represents what may be one or more busses (such as an address bus, data bus, or combination thereof). Although the various blocks of FIG. 10 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 10 is merely illustrative of an exemplary computing device that can be used in connection with one or more embodiments of the present disclosure. Distinction is not made between such categories as "workstation," "server," "laptop," "handheld device," or other computing device, as all are contemplated within the scope of FIG. 10 and with reference to "computing device."

Computing device 11 typically includes a variety of computer-readable media. Computer-readable media can be any available media that can be accessed by computing device 11 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 11. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, or other hardware. Computing device 11 includes one or more processors 14 that read data from various entities such as memory 12 or I/O components 20. Presentation component(s) 16 presents data indications to a user or other device. Exemplary presentation components include a display device, speaker, printing component, vibrating component, and the like.

The I/O ports 18 allow computing device 11 to be logically coupled to other devices, including I/O components 20, some of which may be built in. Illustrative components include a microphone, joystick, game pad, satellite dish, scanner, printer, wireless device, and the like. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 11. The computing device 11 may be equipped with depth cameras, such as stereoscopic camera systems, infrared camera systems, RGB camera systems, and combinations of these, for gesture detection and recognition. Additionally, the computing device 11 may be equipped with accelerometers or gyroscopes that enable detection of motion. The output of the accelerometers or gyroscopes may be provided to the display of the computing device 11 to render immersive augmented reality or virtual reality.

Some embodiments of computing device 11 may include one or more radio(s) 24 (or similar wireless communication components). The radio 24 transmits and receives radio or wireless communications. The computing device 11 may be a wireless terminal adapted to receive communications and media over various wireless networks. Computing device 11 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (for example, mobile hotspot) that provides access to a wireless communications network, such as a WLAN connection using the 802.11 protocol, a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

In some embodiments, the processor(s) 14 represents one or more hardware accelerators. Hardware accelerators are indicative of any suitable hardware component (e.g., GPU) that offloads one or more tasks (e.g., from a CPU) to accelerate or speed up the task. In some embodiments, the hardware accelerator(s) represents a Graphics Processing Unit (GPU), field programmable gate arrays (FPGA), application-specific integrated circuits (ASIC), a Tensor Processing Unit (TPU), a sound card, or any suitable hardware component.

EXAMPLE CLAUSES

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1: A system comprising: at least one computer processor; and one or more computer storage media storing computer-useable instructions that, when used by the at least one computer processor, cause the at least one computer processor to perform operations comprising: receiving, over a computer network, first raw data from one or more network devices, the first raw data representing data from a plurality of departments of a first enterprise, a portion of the first raw data of at least two departments, of the plurality of departments, coming from a different origin or system; based at least in part on natural language included in the first raw data, generating a plurality of computer-readable tags, each computer-readable tag, of the plurality of computer-readable tags, at least partially representing a respective department, of the plurality of departments; subsequent to the generating of the plurality of computer-readable tags, storing, at a computer storage device and in a standardized format, each computer-readable tag, of the plurality of computer-readable tags and the data from the plurality of departments; subsequent to the storing of each computer-readable tag and the data from the plurality of departments in the standardized format, receiving, over the computer network, second raw data from the one or more network devices; and in response to the receiving, over the computer network, the second raw data from the one or more network devices and based at least in part on the generating of the plurality of computer-readable tags for each department, of the plurality of departments, automatically mapping, in near real-time relative to at least the receiving of the second raw data, the second raw data to a first computer-readable tag, the second raw data corresponding to data of a first department of the first enterprise.

Clause 2: The system of clause 1, wherein the generating of the plurality of computer-readable tags is done automatically based on using Natural Language Processing (NLP) of the first raw data to generate the plurality of computer-readable tags.

Clause 3: The system of clause 1 and/or 2, wherein the generating of the plurality of computer-readable tags is done manually based on programmed hand-coded rules and further based on natural language word searching in the first raw data.

Clause 4: The system of clause 1, 2, and/or 3, wherein the automatic mapping, in near real-time, of the second raw data to the first computer-readable tag is based on training a machine learning model to generate a computer-readable tag for a given set of raw data.

Clause 5. The system of clause 1, 2, 3, and/or 4, wherein the operations further comprising: prior to the automatic mapping, in near real-time relative to the receiving of the second raw data, the second raw data to the first computer-readable tag, generating the first computer-readable tag, and wherein the first computer-readable tag is not included among the plurality of computer-readable tags, and wherein the first department represents a new department not included in any department of the plurality of departments.

Clause 6: The system of clause 1, 2, 3, 4, and/or 5, wherein the operations further comprising: prior to the automatic mapping, in near real-time relative to the receiving of the second raw data, the second raw data to the first computer-readable tag, accessing, from the computer storage device, the first computer-readable tag, and wherein the first computer-readable tag is included among the plurality of tags, and wherein the first department represents an existing department included in the plurality of departments.

Clause 7: The system of clause 1, 2, 3, 4, 5, and/or 6, wherein the operations further comprising; receiving, over the computer network, third raw data from a second network device not included in the one or more network devices, the third raw data including data of a second department of a second enterprise; and in response to the receiving, over the computer network, the third raw data from the second network device and based at least in part on the generating of the plurality of computer-readable tags, automatically mapping, in near real-time relative to at least the receiving of the third raw data, the third raw data to the first computer-readable tag, and wherein the first computer-readable tag represents a common attribute shared between at least the first department of the first enterprise and the second department of the second enterprise.

Clause 8: The system of clause 1, 2, 3, 4, 5, 6, and/or 7, wherein the first enterprise corresponds to a first hotel and the second enterprise corresponds to a second hotel.

Clause 9: The system of clause 1, 2, 3, 4, 5, 6, 7, and/or 8, wherein the plurality of departments includes two or more of, a finance department, a rooms department, a marketing department, a revenue management department, a property management department, an accounting department, a reservations department, an online traveling department, a benchmarking department, a guest satisfaction department, and a recreation department.

Clause 10: The system of clause 1, 2, 3, 4, 5, 6, 7, 8, and/or 9, wherein the operations further comprising, providing, over the computer network, remote access to one or more user devices such that any user can update information about the first department in near real-time through a graphical user interface, wherein one or more users provides the updated information in a non-standardized format dependent on a hardware or software platform used at the one or more user devices, and wherein the updated information represents the second raw data.

Clause 11: The system of clause 1, 2, 3, 4, 5, 6, 7, 8, 9, and/or 10, wherein the operations further comprising: automatically generating a message containing updated information about the first department whenever the updated information has been stored to the storage device; and transmitting, over the computer network, the message to all user devices in near real time such that each user has immediate access to updated information about the department.

Clause 12: A computer-implemented method comprising: receiving, over a computer network, first raw data from a first network device, the first raw data including department data of a first department of a first hotel; and in response to the receiving, over the computer network, the first raw data from the first network device and based at least in part on one or more words included in the first raw data, automatically mapping, in near real-time relative to a time at which the first raw data was generated, the first raw data to a first computer-readable tag, the computer-readable tag representing at least one of the first department or a category of the first department, the computer-readable tag including a different character sequence than the first raw data, the first computer-readable tag having been generated during an onboarding process of the hotel prior to the receiving of the first raw data.

Clause 13: The computer-implemented method of clause 12, wherein the first computer-readable tag that was generated during the onboarding process was generated automatically based on using Natural Language Processing (NLP) of raw data.

Clause 14: The computer-implemented method of clause 12 and/or 13, wherein the first computer-readable tag that was generated during the onboarding process was generated manually based on programmed hand-coded rules and further based on natural language word searching in raw data.

Clause 15: The computer-implemented method of clause 12, 13, and/or 14, wherein the automatic mapping, in near real-time relative to the time at which the first raw data was generated, the first raw data to the first computer-readable tag is based on training a machine learning model to generate a computer-readable tag for a given set of raw data.

Clause 16: The computer-implemented method of clause 12, 13, 14, and/or 15, wherein the operations further comprising: prior to the automatic mapping, in near real-time relative to the time at which the first raw data was generated, the first raw data to the first computer-readable tag, generating the first computer-readable tag, and wherein the first computer-readable tag represents a new department not included in any department, of a plurality of departments, determined during the onboarding process.

Clause 17: The computer-implemented method of clause 12, 13, 14, 15, and/or 16, further comprising: receiving, over the computer network, second raw data from a second network device, the second raw data including data of a second department or category of a second enterprise; and in response to the receiving, over the computer network, the second raw data from the second network device and based at least in part on the generating of the first computer-readable tag, automatically mapping, in near real-time relative to at least the receiving of the second raw data, the second raw data to the first computer-readable tag, and wherein the first computer-readable tag represents a common attribute shared between at least the first department or category of the first enterprise and the second department or category of the second enterprise.

Clause 18: The computer-implemented method of clause 12, 13, 14, 15, 16, and/or 17, wherein the first department includes one of, a finance department, a rooms department, a marketing department, a revenue management department, a property management department, an accounting department, a reservations department, an online traveling department, a benchmarking department, a guest satisfaction department, and a recreation department.

Clause 19: One or more computer storage media having computer-executable instructions embodied thereon that, when executed, by one or more processors, cause the one or more processors to perform operations comprising: receiving, over a computer network, first raw data from one or more network devices, the first raw data representing one or more departments of a first enterprise; converting the first raw data into standardized data that is structured in a standardized format; mapping, in near real-time relative to at least the receiving of the first raw data, at least a portion of the standardized data or the first raw data into one or more computer-readable tags; storing, in computer storage, at least the portion of the standardized data in association with the one or more computer-readable tags; and based at least in part on the mapping of at least the portion of the standardize data or the first raw data into one or more computer-readable tags, causing presentation, at a user device, of one or more user interface elements that include the one or more computer-readable tags.

Clause 20: The one or more computer storage media of clause 19, wherein the first enterprise corresponds to a first hotel.

Clause 21: The one or more computer storage media of clause 19, further comprising one or more of the clauses 1 through 20.

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

As described herein, at least a portion of these clauses (and the claims themselves) are indicative of the technical effects describe above with respect to the technical effects of increased accuracy and compatibility even when data is generated or received from disparate sources.

The invention claimed is:

1. A system comprising:
   at least one computer processor; and
   one or more computer storage media storing computer-useable instructions that, when used by the at least one computer processor, cause the at least one computer processor to perform operations comprising:
   receiving, over a computer network, first raw data from one or more network devices, the first raw data representing data from a plurality of departments of a first enterprise, the first enterprise being a business organization, each department, of the plurality of departments, being a distinct division within the business organization, a portion of the first raw data of at least two departments, of the plurality of departments, coming from different databases representing disparate data sources that are diverse in at least one of: format, protocols, or structure;

based at least in part on natural language included in the first raw data, generating a plurality of computer-readable tags, each computer-readable tag, of the plurality of computer-readable tags, at least partially representing a respective department, of the plurality of departments, each computer-readable tag being a character sequence that is not a natural language word or sentence, each computer-readable tag being a different character sequence that any portion of the first raw data;

subsequent to the generating of the plurality of computer-readable tags, storing, at a computer storage device and in a standardized format, each computer-readable tag, of the plurality of computer-readable tags and the data from the plurality of departments;

subsequent to the storing of each computer-readable tag and the data from the plurality of departments in the standardized format, receiving, over the computer network, second raw data from the one or more network devices; and in response to the receiving, over the computer network, the second raw data from the one or more network devices and based at least in part on the generating of the plurality of computer-readable tags for each department, of the plurality of departments, automatically mapping, without issuing multiple queries across the databases representing disparate data sources and without receiving manual user input, the second raw data to a first computer-readable tag in a single input/output (I/O) computer operation, the first computer-readable tag being one of the plurality of computer-readable tags, the automatic mapping of the second raw data to the first computer-readable tag being done in near real-time relative to at least the receiving of the second raw data, the second raw data corresponding to data of a first department, of the plurality of departments, of the first enterprise.

2. The system of claim 1, wherein the generating of the plurality of computer-readable tags is done automatically based on using Natural Language Processing (NLP) of the first raw data to generate the plurality of computer-readable tags.

3. The system of claim 1, wherein the generating of the plurality of computer-readable tags is done manually based on programmed hand-coded rules and further based on natural language word searching in the first raw data.

4. The system of claim 1, wherein the automatic mapping, in near real-time, of the second raw data to the first computer-readable tag is based on training a machine learning model to generate a computer-readable tag for a given set of raw data.

5. The system of claim 1, wherein the operations further comprising:

prior to the automatic mapping, in near real-time relative to the receiving of the second raw data, the second raw data to the first computer-readable tag, generating the first computer-readable tag, and wherein the first computer-readable tag is not included among the plurality of computer-readable tags, and wherein the first departmentment represents a new department not included in any department of the plurality of departments.

6. The system of claim 1, wherein the operations further comprising:

prior to the automatic mapping, in near real-time relative to the receiving of the second raw data, the second raw data to the first computer-readable tag, accessing, from the computer storage device, the first computer-readable tag, and wherein the first computer-readable tag is included among the plurality of tags, and wherein the first department represents an existing department included in the plurality of departments.

7. The system of claim 1, wherein the operations further comprising;

receiving, over the computer network, third raw data from a second network device not included in the one or more network devices, the third raw data including data of a second department of a second enterprise; and in response to the receiving, over the computer network, the third raw data from the second network device and based at least in part on the generating of the plurality of computer-readable tags, automatically mapping, in near real-time relative to at least the receiving of the third raw data, the third raw data to the first computer-readable tag, and wherein the first computer-readable tag represents a common attribute shared between at least the first department of the first enterprise and the second department of the second enterprise.

8. The system of claim 7, wherein the first enterprise corresponds to a first hotel and the second enterprise corresponds to a second hotel.

9. The system of claim 1, wherein the plurality of departments includes two or more of, a finance department, a rooms department, a marketing department, a revenue management department, a property management department, an accounting department, a reservations department, an online traveling department, a benchmarking department, a guest satisfaction department, and a recreation department.

10. The system of claim 1, wherein the operations further comprising, providing, over the computer network, remote access to one or more user devices such that any user can update information about the first department in near real-time through a graphical user interface, wherein one or more users provides the updated information in a non-standardized format dependent on a hardware or software platform used at the one or more user devices, and wherein the updated information represents the second raw data.

11. The system of claim 1, wherein the operations further comprising:

automatically generating a message containing updated information about the first department whenever the updated information has been stored to the storage device; and transmitting, over the computer network, the message to all user devices in near real time such that each user has immediate access to the updated information about the department.

12. One or more computer storage media having computer-executable instructions embodied thereon that, when executed, by one or more processors, cause the one or more processors to perform operations comprising:

receiving, over a computer network, first raw data from one or more network devices, the first raw data representing one or more departments of a first enterprise, the first enterprise being a business organization, the one or more departments including a distinct division within the business organization, a portion of the first raw data coming from disparate data sources that are diverse in at least one of: format, protocols, or structure;

converting the first raw data into standardized data that is structured in a standardized format;

mapping at least a portion of the standardized data or the first raw data into one or more computer-readable tags, the one or more computer-readable tags being a character sequence that is not a natural language word or sentence, the one or more computer-readable tags being a different character sequence than one or more portions of the first raw data, the one or more computer-readable tags corresponding to data used to register or onboard the first enterprise;

storing, in computer storage, at least the portion of the standardized data in association with the one or more computer-readable tags; and in response to receiving, over the computer network, second raw data from the one or more network devices and based at least in part on the mapping at least a portion of the standardized data or the first raw data into the one or more computer-readable tags, automatically mapping the second raw data to the one or more computer-readable tags in a reduced number of I/O operations relative to issuing multiple queries or issuing multiple manual user inputs across the disparate data sources, the automatic mapping of the second raw data to the one or more computer-readable tags being done in near real-time relative to at least the receiving of the second raw data.

13. The one or more computer storage media of claim 12, wherein the first enterprise corresponds to a first hotel.

\* \* \* \* \*